United States Patent
Doi et al.

(10) Patent No.: US 7,638,562 B2
(45) Date of Patent: Dec. 29, 2009

(54) INK RECEPTIVE PARTICLES, MATERIAL FOR RECORDING, RECORDING APPARATUS AND INK RECEPTIVE PARTICLE STORAGE CARTRIDGE

(75) Inventors: Takatsugu Doi, Kanagawa (JP); Masaya Ikuno, Kanagawa (JP); Ken Hashimoto, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 382 days.

(21) Appl. No.: 11/805,882

(22) Filed: May 24, 2007

(65) Prior Publication Data
US 2008/0032074 A1    Feb. 7, 2008

(30) Foreign Application Priority Data
Aug. 2, 2006 (JP) ............... 2006-210973
Nov. 10, 2006 (JP) ............... 2006-305163

(51) Int. Cl.
*C09D 11/00* (2006.01)
(52) U.S. Cl. ............ 523/206; 523/221; 523/160; 523/161; 524/81
(58) Field of Classification Search ........... 523/160, 523/161, 206, 221; 524/81
See application file for complete search history.

(56) References Cited

U.S. PATENT DOCUMENTS

| | | | | |
|---|---|---|---|---|
| 6,716,562 B2* | 4/2004 | Uehara et al. | ............ | 430/125.3 |
| 2002/0098326 A1 | 7/2002 | Sato et al. | | |

FOREIGN PATENT DOCUMENTS

| | | |
|---|---|---|
| JP | 08-259863 | 10/1996 |
| JP | 10-16382 | 1/1998 |
| JP | 2001-010114 | 6/1999 |
| JP | 11-277897 | 10/1999 |
| JP | 2000-94654 | 4/2000 |
| JP | 2000-343808 | 12/2000 |
| JP | 2002-113856 | 4/2002 |
| JP | 2002-321443 | 5/2002 |
| JP | 2002-370347 | 12/2002 |
| JP | 2003-57967 | 2/2003 |
| JP | 2003-80746 | 3/2003 |
| JP | 2003-312195 | 11/2003 |
| JP | 2005-189423 | 7/2005 |

OTHER PUBLICATIONS

Li et al. (Journal of Colloid and Interface Science 297 (2006), 705-710).*
Okubo et al. (Colloids and Surfaces A: Physicochemical and Engineering Aspects 109 (1996) 49-53).*
Lu et al. (Colloids and Surfaces A: Physicochemical and Engineering Aspects 153 (1999) 609-615).*
Huang et al. (Langmuir 22 (2006) 8127-8133).*
Park (Korea Polymer Journal 9(1) (2001) 51-65).*

* cited by examiner

*Primary Examiner*—David Wu
*Assistant Examiner*—Vu Nguyen
(74) *Attorney, Agent, or Firm*—Fildes & Outland, P.C.

(57) ABSTRACT

Ink receptive particles for receiving ink, including: particles P including hydrophilic polymer particles having a ratio of hydrophilic monomer(s) to the total monomer components thereof of from about 10 mol % to about 90 mol %; and hydrophobic polymer particles, attached to at least a part of a surface of the particles P and having a ratio of hydrophilic monomer(s) to the total monomer components thereof of from about 0 mol % to about 10 mol %.

2 Claims, 9 Drawing Sheets

INK RECEPTIVE PARTICLES, MATERIAL FOR RECORDING, RECORDING APPARATUS AND INK RECEPTIVE PARTICLE STORAGE CARTRIDGE

CROSS-REFERENCE TO RELATED APPLICATIONS

This application is based on and claims priority under 35 USC 119 from Japanese Patent Application Nos. 2006-210973 filed Aug. 2, 2006 and 2006-305163 filed Nov. 10, 2006.

BACKGROUND

1. Technical Field

The present invention relates to an ink receptive particle. The invention also relates to a material for recording, recording apparatus and ink receptive particle storage cartridge, which utilize this ink receptive particle.

2. Related Art

The ink jet recording method is known as one of the methods of recording image and data by using ink. The principle of the ink jet recording method is to record on paper, cloth, film or the like by ejecting liquid or melted solid ink from a nozzle, slit, porous film or the like. Ink ejecting methods include a charge control method of ejecting ink by making use of electrostatic attraction forces, drop on-demand method (pressure pulse method) of ejecting ink by making use of the oscillation pressure of piezo elements, thermal ink jet method of ejecting ink by making use of pressure caused by forming and growing foams by intense heat, and others, and images or data of extremely high definition can be recorded by these methods.

Among recording methods using ink, including this ink jet recording method, methods of first recording on an intermediate body and then transferring to a recording medium are proposed, in order to record at high image quality on various forms of recording medium such as permeable medium and impermeable medium.

SUMMARY

According to an aspect of the invention, there is provided ink receptive particles for receiving ink, comprising: particles P containing hydrophilic polymer particles having a ratio of a hydrophilic monomer to the total monomer components of from 10 mol % or more to 90 mol % or less; and hydrophobic polymer particles attached to at least a part of a surface of the particles P having a ratio of a hydrophilic monomer to the total monomer components of from 0 mol % or more to less than 10 mol %.

DETAILED DESCRIPTION

Figure 1:
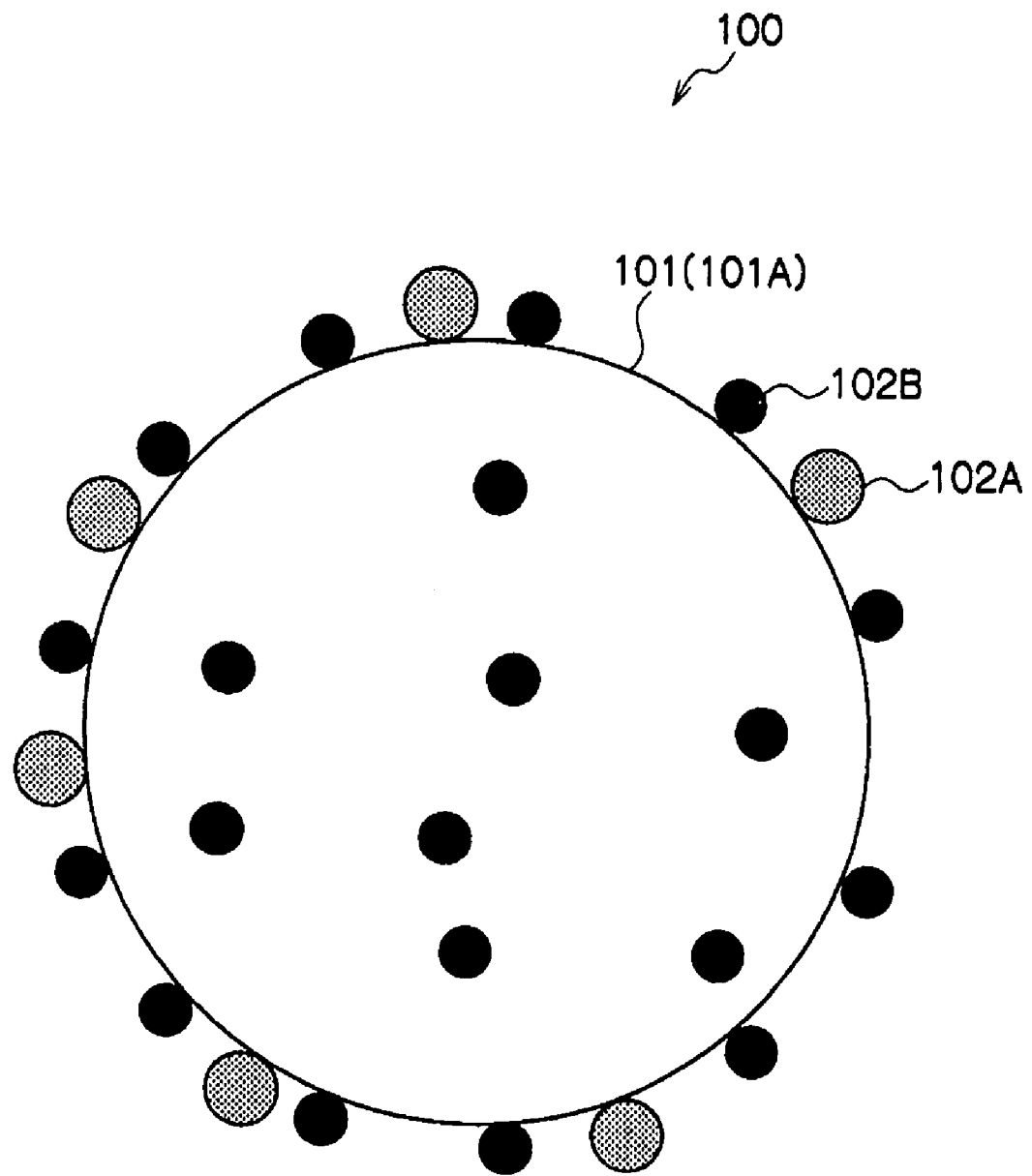
FIG. 1 is a schematic diagram showing one example of ink receptive particles according to an exemplary embodiment.

The exemplary embodiments of the present invention are performed in the following items.

<1> Ink receptive particles for receiving ink, the ink receptive particles comprising:

particles P including hydrophilic polymer particles having a ratio of hydrophilic monomer(s) to the total monomer components thereof of from about 10 mol % to about 90 mol %; and hydrophobic polymer particles, attached to at least a part of a surface of the particles P and having a ratio of hydrophilic monomer(s) to the total monomer components thereof of from about 0 mol % to about 10 mol %.

<2> The ink receptive particles of item <1>, wherein in the hydrophilic polymer particles, the ratio of hydrophilic monomer(s) to the total monomer components thereof is from about 30 mol % to about 80 mol %; and the hydrophobic polymer particles have an average spherical equivalent diameter from about 0.015 to about 0.2 μm and the ratio of hydrophilic monomer(s) to the total monomer components is from about 2 mol % to about 5 mol %.

<3> The ink receptive particles of item <1>, wherein a ratio of the hydrophobic polymer particles to the total ink receptive particles is from about 0.1% to about 5% by weight.

<4> The ink receptive particles of claim 1, wherein a ratio of the hydrophobic polymer particles to the total ink receptive particles is approximately from about 0.5% to about 2% by weight.

<5> The ink receptive particles of item <1>, the ink receptive particles wherein at least the hydrophilic polymer particles are aggregated composite particles, and the composite particles trap an ink component in gaps between the particles within the composite particles.

<6> The ink receptive particles of item <5>, wherein the ink contains a recording material, and the ink receptive particles trap the recording material in gaps between the particles within the composite particles.

<7> A material for recording comprising: ink; and the ink receptive particles of any one of items <1> to <6>.

<8> A recording apparatus comprising:

the ink receptive particles of any one of items <1> to <4>;

an ink eject unit for discharging ink;

a transfer unit for transferring the ink receptive particles to a recording medium; and the ink receptive particles being supplied onto the transfer unit and receiving the ink discharged from the ink discharge unit.

<9> A recording apparatus comprising:

the ink receptive particles of item <5>;

an ink discharge unit for discharging ink;

a transfer unit for transferring the ink receptive particles to a recording medium; and the ink receptive particles being supplied onto the transfer unit and receiving the ink discharged from the ink discharge unit.

<10> A recording apparatus comprising:
the ink receptive particles of item <6>;
an ink discharge unit for discharging ink;
a transfer unit for transferring the ink receptive particles to a recording medium; and
the ink receptive particles being supplied onto the transfer unit and receiving the ink discharged from the ink discharge unit.

<11> An ink receptive particle storage cartridge detachably disposed to a recording apparatus and storing the ink receptive particles of any one of items <1> to <6>.

<12> Ink receptive particles for receiving ink, comprising:
hydrophilic polymer having a ratio of hydrophilic monomer(s) to the total monomer components thereof of from about 10 mol % to about 90 mol %; and
hydrophobic polymer having a ratio of hydrophilic monomer(s) to the total monomer components thereof of approximately from about zero mol % to about 10 mol %.

<13> The ink receptive particles of item <12>, wherein
in the hydrophilic polymer, the ratio of hydrophilic monomer(s) to the total monomer components thereof is from about 30 mol % to about 80 mol %; and
in the hydrophobic polymer, the ratio of hydrophilic monomer(s) to the total monomer components thereof is from about 2 mol % to about 5 mol %.

<14> The ink receptive particles of item <12>, wherein a ratio of the hydrophobic polymer to the total ink receptive particles is from about 0.1% to about 5% by weight.

<15> The ink receptive particles of item <12>, wherein a ratio of the hydrophobic polymer to the total ink receptive particles is from about 0.5% to about 2% by weight.

<16> The ink receptive particles of item <12>, wherein the hydrophobic polymer comprises a charge control agent for controlling charging of the ink receptive particles.

<17> The ink receptive particles of item <12>, wherein the ink receptive particles are composite particles of a plurality of particles, and an ink component is trapped in gaps between the particles within the composite particles.

<18> The ink receptive particles of item <17>, wherein the ink contains a recording material and the ink receptive particles trap the recording material in gaps between the particles within the composite particles.

<19> A material for recording comprising: ink; and the ink receptive particles of item <12>.

<20> A recording apparatus comprising:
the ink receptive particles of item <12>;
an ink discharge unit for discharging ink;
a transfer unit for transferring the ink receptive particles to a recording medium; and
the ink receptive particles being supplied onto the transfer unit and receiving the ink discharged from the ink discharge unit.

The exemplary embodiments are described in detail hereinafter.

(Ink Receptive Particles)

Ink receptive particles of the exemplary embodiments receive an ink component when ink contacts with the particles. Here, ink receptivity signifies retention of at least a part (at least a liquid component) of an ink component. Then, ink receptive particles of the exemplary embodiments have particles containing hydrophilic polymer particles in which the ratio of a hydrophilic monomer to the total monomer components is from 10 mol % or more to 90 mol % or less (particles containing hydrophilic polymer particles are hereinafter referred to as "host particles"), and hydrophobic polymer particles attached to at least a part of the surface of the above-mentioned host particles, in which the ratio of a hydrophilic monomer to the total monomer components is from 0 mol % or more to less than 10 mol %.

Ink receptive particles of the exemplary embodiments may be a form such that host particles are composed of hydrophilic polymer particles singly (primary particles), or a form such that host particles are composed of composite particles in which at least hydrophilic polymer particles are assembled. Also, the hydrophilic polymer particles may be hydrophilic resin particles.

Then, in the case where ink receptive particles are stored and hydrophilic polymer particles contained in host particles absorb moisture in the atmosphere, and in the case where ink is provided for ink receptive particles, which absorb a liquid component of the ink, electrification characteristics on an ink receptive particle surface are secured for the reason that hydrophobic polymer particles are attached to the surface of host particles. Also, in another embodiment, electrification characteristics on an ink receptive particle surface are secured for the reason that hydrophobic polymer is contained inside of host particles and thereby ink receiving does not be inhibited by hydrophobic polymer.

Here, in the case of a form such that host particles are composed of hydrophilic polymer particles singly (primary particles), when ink receptive particles receive ink, when ink is attached to ink receptive particles and then at least a liquid component of ink is absorbed in hydrophilic polymer particles.

Thus, ink receptive particles receive ink. Then, recording is performed by transferring ink receptive particles receiving ink to a recording medium.

On the other hand, in the case of a form such that host particles are composed of composite particles in which at least hydrophilic polymer particles are assembled, when ink receptive particles receive ink, ink is first attached to ink receptive particles and then at least a liquid component of ink is trapped by a gap (a gap between particles (a void) is occasionally referred to as the trap structure hereinafter) between particles (at least hydrophilic polymer particles) composing composite particles. At this time, a recording material among ink components is attached to an ink receptive particle surface or trapped by the trap structure. Thus, ink receptive particles receive ink. Then, recording is performed by transferring ink receptive particles receiving ink to a recording medium.

The trap of the ink liquid component by this trap structure is a physical and/or chemical trap by a gap between particles (a physical particle wall structure).

Then, a form such that host particles are composed of composite particles in which at least hydrophilic polymer particles are assembled is applied, so that the ink liquid component is absorbed and retained by the trap by a gap (a physical particle wall structure) between particles composing the composite particles as well as hydrophilic polymer particles.

The ink liquid component is absorbed and retained also by hydrophilic polymer particles.

After transferring ink receptive particles, the component of hydrophilic polymer particles composing ink receptive particles functions also as binder resin and coating resin of a recording material contained in ink. In addition, in the case where ink receptive particles are composite particles, a recording material is trapped by the trap structure. In particular, it is desirable that transparent resin is applied as the component of hydrophilic polymer particles composing ink receptive particles.

The addition of a large amount of resin to ink is necessary for improving fixity (abrasion resistance) of ink (for example, pigment ink) using an insoluble component such as pigment and a dispersed particulate matter as a recording material; however, the addition of a large amount of a polymer to ink (including treatment solution thereof) deteriorates reliability such as nozzle clogging of an ink discharging means. On the contrary, in the exemplary embodiments of the present invention, an polymer component composing ink receptive particles can also serve a function as the resin.

Here, "the above-mentioned gap between particles composing composite particles", namely, "the trap structure" is a physical particle wall structure capable of trapping at least liquid. Then, the size of this gap is desirably from 0.1 to 5 μm, more desirably from 0.3 to 1 μm at the largest bore. In particular, the size of the gap is preferably a size capable of trapping a recording material, for example, pigment having a volume-average particle diameter of 100 nm. A micropore having the largest opening bore of less than 50 nm may exist. Voids or capillary tubes are preferably connected inside the particles.

The aperture size can be determined by reading in a scanning electron microscope (SEM) image of the particle surface by an image analyzer, detecting the gap by binary coding process, and analyzing the size and distribution of gaps.

It is desirable that the trap structure traps not only the liquid components from the ink components but also the recording material. Together with the ink liquid components, when recording material, in particular, pigments are trapped in the trap structure, the recording material is retained and fixed within the ink receptive particles without being unevenly distributed, to achieve both high speed recording and high image quality at the same time. Ink liquid components are mainly ink solvents (dispersion media: vehicle liquids).

Ink receptive particles of the exemplary embodiments are described in further detail hereinafter. Ink receptive particles of the exemplary embodiments, as described above, may be a form such that host particles are composed of hydrophilic polymer particles singly (primary particles), or a form such that host particles are composed of composite particles in which at least hydrophilic polymer particles are assembled. Then, examples of particles except hydrophilic polymer particles composing composite particles include inorganic particles and porous particles. Needless to say, host particles may be composed of composite particles in which only plural hydrophilic polymer particles are assembled. Examples of particles attached to a host particle surface include inorganic particles in addition to hydrophobic polymer particles.

Figure 2:
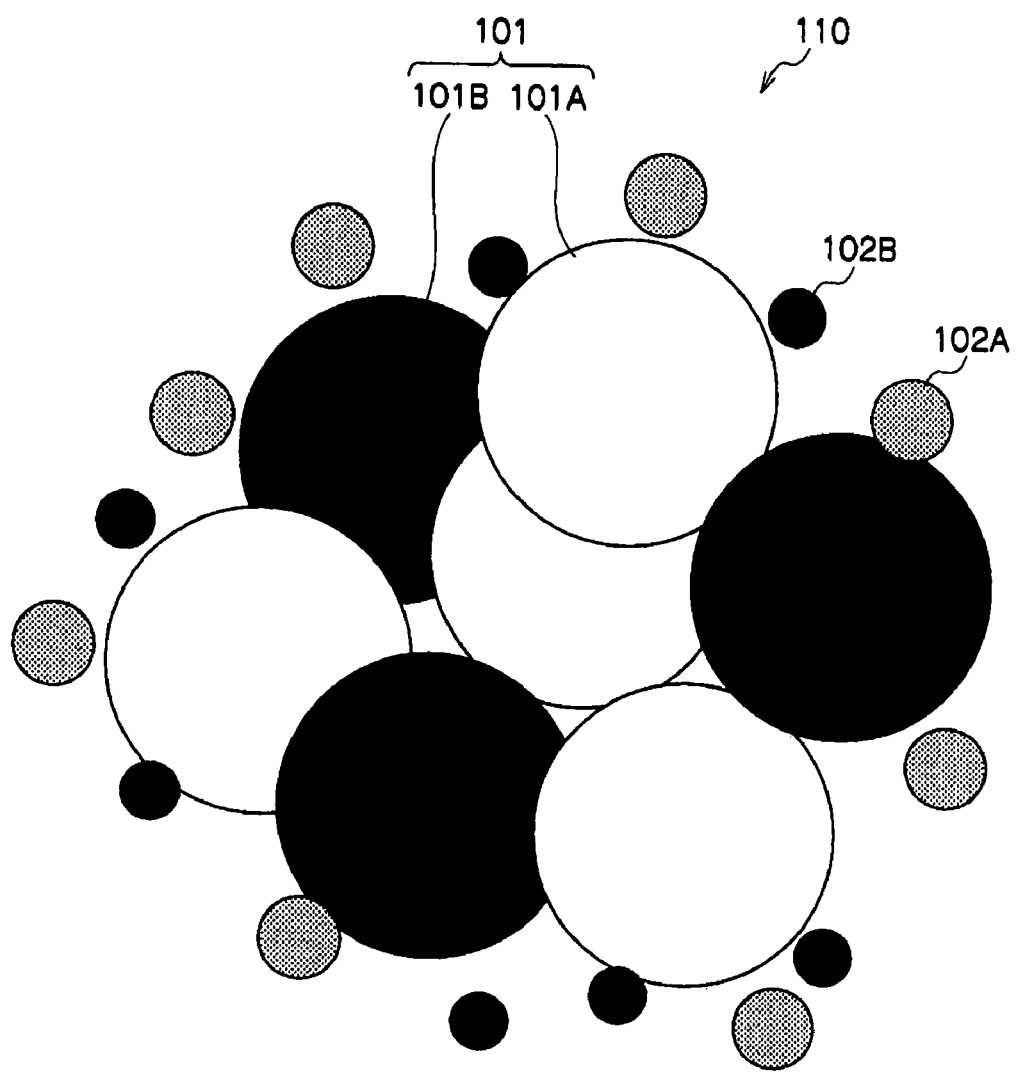
FIG. 2 is a schematic diagram showing another example of ink receptive particles according to an exemplary embodiment.

Examples of a specific composition of ink receptive particles of the exemplary embodiments include a form of ink receptive particles 100 having host particles 101 composed of hydrophilic polymer particles 101A singly (primary particles), hydrophobic polymer particles 102A and inorganic particles 102B attached to the host particles 101, as shown in FIG. 1; and a form of ink receptive particles 110 having host particles 101 as composite particles in which hydrophilic polymer particles 101A and inorganic particles 101B are compounded, hydrophobic polymer particles 102A and inorganic particles 102B attached to the host particles 101, as shown in FIG. 2. With regard to these host particles as composite particles, a void structure is formed by gaps between particles.

Here, in the case where host particles are composed of composite particles, the weight ratio between hydrophilic polymer particles and other particles (hydrophilic polymer particles:other particles) is a range of 5:1 to 1:10, for example, in the case where other particles are inorganic particles.

With regard to the particle diameter of host particles, average spherical equivalent diameter is desirably from 0.1 to 50 μm, more desirably from 0.5 to 25 μm and far more desirably from 1 to 10 μm.

In the case where host particles are composed of composite particles, BET specific surface area thereof ($N_2$) is a range of from 1 to 750 $m^2/g$, for example.

Then, in the case where host particles are composed of composite particles, composite particles are obtained in such a manner that the particles are granulated in a semi-sintered state, for example. The semi-sintered state signifies a state in which the particle shape remains to some degree and a void is retained between the particles. With regard to composite particles, when an ink liquid component is trapped by the trap structure, at least a part of the particles may be dissociated, that is, the composite particles may be dismantled and particles composing these composite particles may be disjoined.

In the case that main component of the ink receptive particle is polymer, in a form such that host particles are composed of particles singly, hydrophobic polymer is contained inside host particles (hydrophilic polymer) together with hydrophilic polymer. On the other hand, in a form such that host particles are composed of composite particles in which plural particles are assembled, hydrophobic polymer may be contained inside particles (occasionally referred to as hydrophilic polymer particles hereinafter) containing hydrophilic polymer composing composite particles, or contained in composite particles as particles (particles containing this hydrophobic polymer and composed thereof are occasionally referred to as hydrophobic polymer particles hereinafter) composing the composite particles together with hydrophilic polymer particles. The hydrophobic polymer may contain not merely hydrophobic polymer but also a third component (such as a charge control agent). In the case where hydrophobic polymer is contained inside hydrophilic polymer particles, for example, the hydrophobic polymer is contained thereinside while forming a domain. Then, composite particles may contain and be composed of, as required, materials except hydrophilic polymer and hydrophobic polymer; examples of the materials include inorganic materials and porous materials. For example, inorganic materials may be attached to a host particle surface.

Figure 8:
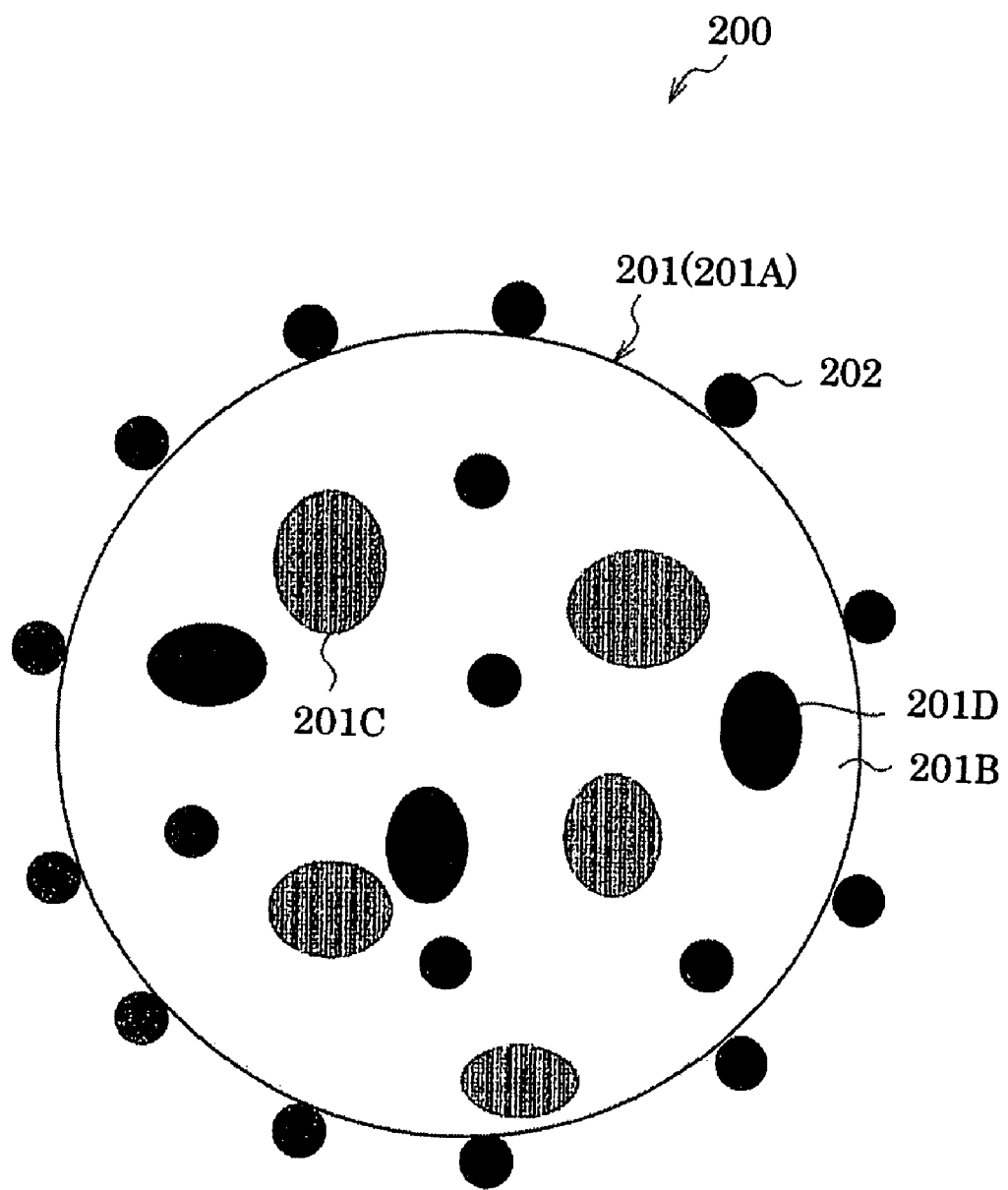
FIG. 8 is a schematic diagram showing one example of ink receptive particles according to another exemplary embodiment.
Figure 9:
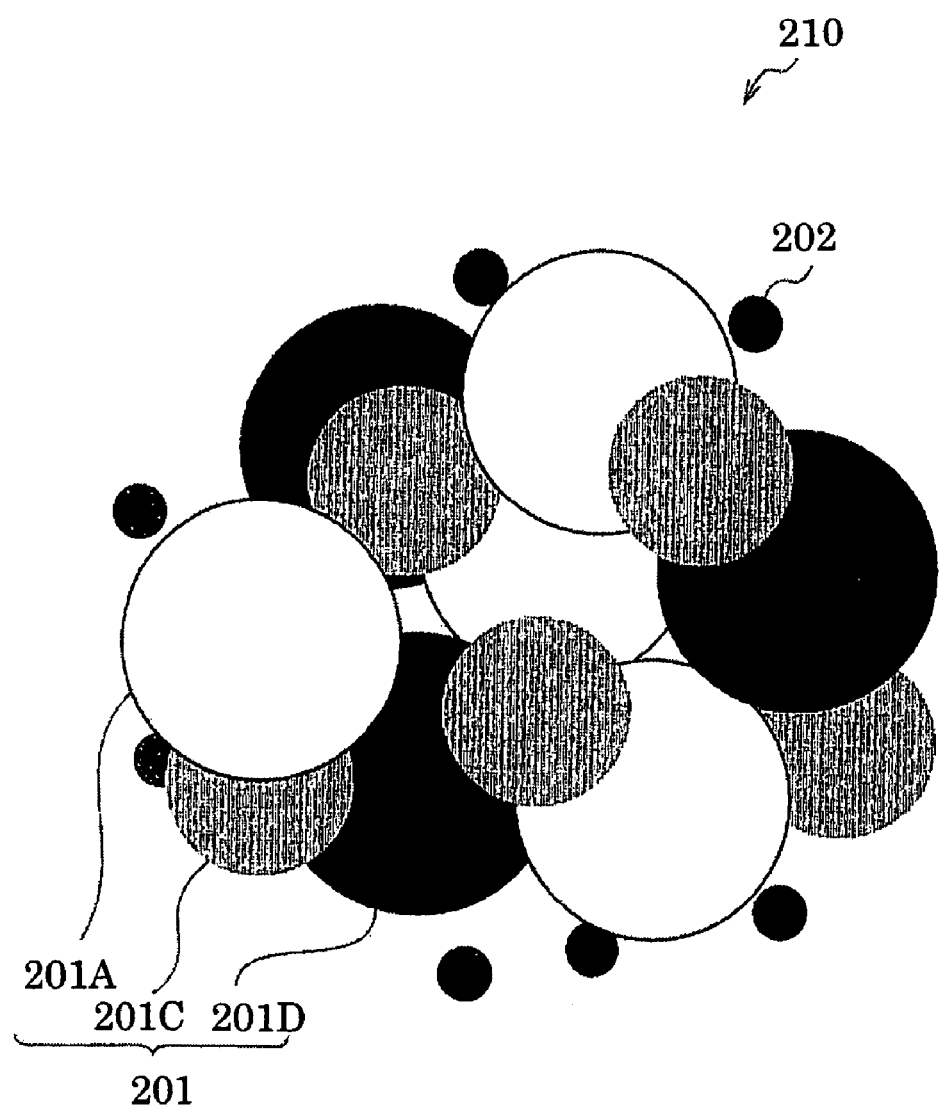
FIG. 9 is a schematic diagram showing another example of ink receptive particles according to another exemplary embodiment.

In the case that main component of the ink receptive particle is polymer, Examples of a specific composition of ink receptive particles of the exemplary embodiments include a form of ink receptive particles 200 having host particles 201 composed of hydrophilic polymer particles 201A singly (primary particles), hydrophobic polymer particles 202A and inorganic particles 202B attached to the host particles 201, as shown in FIG. 8; and a form of ink receptive particles 210 having host particles 201 as composite particles in which hydrophilic polymer particles 201A and inorganic particles 201B are compounded, hydrophobic polymer particles 202A and inorganic particles 202B attached to the host particles 201, as shown in FIG. 9. With regard to these host particles as composite particles, a void structure is formed by gaps between particles. With regard to the particle diameter of host particles, average spherical equivalent diameter of from 0.1 to 75 μm is provided. Average spherical equivalent diameter is determined by the following methods. There are various kinds of available methods, for example, to measure spherical diameter of the dispersed particle in the liquid by light scattering principle or to measure projection image of the particle by using image processing. As conventional methods, there are a Microtrack UPA method or a Coulter counter method.

Next, hydrophilic polymer particles are described. With regard to hydrophilic polymer particles, the ratio of a hydrophilic monomer to the total monomer components is from 10 mol % or more to 90 mol % or less, desirably from 15 mol % or more to 85 mol % or less, and more desirably from 30 mol % or more to 80 mol % or less. Specifically, hydrophilic polymer particles contain and are composed of polymer (hereinafter referred to as water absorbing resin) in the above-mentioned ratio of a hydrophilic monomer. Ink is trapped by a gap in and between particles at high speed, so that printing at high speed can be performed.

Hydrophilic polymer particles signify such that the above-mentioned ratio of a hydrophilic monomer is in the above-mentioned range.

Here, a hydrophilic monomer is a monomer containing ethylene oxide group, carboxylic acid, sulfonic acid, substituted or unsubstituted amino group, hydroxyl group and salts thereof. For example, in the case of providing positive charging, the hydrophilic monomer is desirably a monomer having a halogenation structure such as (substituted) amino group, (substituted) pyridine group and amine salt thereof, and quaternary ammonium salt. In the case of providing negative charging, the hydrophilic monomer is desirably a monomer having an organic acid (salt) structure such as carboxylic acid (salt) and sulfonic acid (salt).

The ratio of a hydrophilic monomer is calculated in the following manner. The composition of an organic component is first specified from analysis procedures such as weight spectrometric analysis, NMR and IR. Thereafter, acid value and base value of an organic component are measured in conformity to JIS K0070 or JIS K2501. The ratio of a hydrophilic monomer can be calculated from the composition and acid value/base value of an organic component. The same manner is performed hereinafter.

Hydrophilic polymer particles, for example, are composed of liquid absorbing resin. In another embodiment, hydrophilic polymer particles contain and are composed of hydrophilic polymer (occasionally referred to as "liquid absorbing resin" hereinafter) as described above.

The liquid absorbing resin can soften and contribute to fixity for the reason that an ink liquid component (such as water and aqueous solvent) absorbed therein functions as a plasticizer of resin (polymer).

Liquid absorbing resin is preferably weak liquid absorbing resin. This weak liquid absorbing resin signifies liquid absorbing resin capable of absorbing by approximately from several % ($\approx$5%) to several hundreds % ($\approx$500%), desirably from 5% to 100% with respect to resin weight, for example, in the case of absorbing water as liquid.

Liquid absorbing resin can be composed of, for example, a homopolymer of a hydrophilic monomer or a copolymer composed of both monomers of a hydrophilic monomer and a hydrophobic monomer, and yet the copolymer is desirable for obtaining weak liquid absorbing resin. The liquid absorbing resin may be composed of not merely a monomer but also a graft copolymer or a block copolymer in which a starting unit such as a polymer/oligomer structure is copolymerized with another unit.

Here, examples of a hydrophilic monomer include a monomer containing —OH, -EO unit (ethylene oxide group), —COOM (M is, for example, hydrogen, alkali metals such as Na, Li and K, ammonia, and organic amines), —SO$_3$M [M is, for example, hydrogen, alkali metals such as Na, Li and K, ammonia, and organic amines), —NR$_3$ (R is, for example, H, alkyl and phenyl), and —NR$_4$X (R is, for example, H, alkyl and phenyl, and X is, for example, halogen, sulfate group, acid anions such as carboxylic acid, and BF$_4$). Specific examples thereof include 2-hydroxyethyl methacrylate, 2-hydroxyethyl acrylate, acrylamide, acrylic acid, methacrylic acid, unsaturated carboxylic acid, crotonic acid and maleic acid. Examples of a hydrophilic unit or monomer include cellulose derivatives such as cellulose, ethyl cellulose and carboxymethyl cellulose, starch derivatives, monosaccharides/polysaccharides derivatives, polymerizable carboxylic acids and (partially) neutralized salts thereof such as vinyl sulfonic acid, styrenesulfonic acid, acrylic acid, methacrylic acid and maleic acid (anhydride), vinyl alcohols, derivatives and onium salts thereof such as vinylpyrrolidone, vinylpyridine, amino(meth)acrylate and dimethylamino (meth)acrylate, amides such as acrylamide and isopropylacrylamide, polyethylene oxide chain-containing vinyl compounds, hydroxyl group-containing vinyl compounds, and polyesters composed of multifunctional carboxylic acid and polyhydric alcohol, particularly, branched polyester containing trifunctional or more acid such as trimellitic acid as a component and containing terminal carboxylic acid and hydroxyl group in large quantities, and polyester containing a polyethylene glycol structure.

The hydrophobic monomers are monomers a having hydrophobic group, and specific examples include olefin (tyrene, butadiene, etc.), styrene, alpha-methyl styrene, alpha-ethyl styrene, methyl methacrylate, ethyl methacrylate, butyl methacrylate, acrylonitrile, vinyl acetate, methyl acrylate, ethyl acrylate, butyl acrylate, lauryl methacrylate, and the like. Examples of a hydrophobic unit or monomer include styrene derivatives such as styrene, alpha-methyl styrene, vinyl toluene; polyolefines such as vinyl cyclohexane, vinyl naphthalene, vinyl naphthalene derivatives, alkyl acrylate, phenyl acrylate, alkyl methacrylate, phenyl methacrylate, cycloalkyl methacrylate, alkyl crotonate, dialkyl itaconate, dialkyl maleate, polyethylene, ethylene/vinyl acetate, polypropylene, or the like; and derivatives thereof.

Specific examples of liquid absorbing resin composed of copolymers of the hydrophilic monomer and the hydrophobic monomer include olefin polymers (or its modifications, or products into which a carboxylic acid unit is introduced by copolymerization, or the like) such as (meth)acrylate, styrene/(meth)acrylate/(an hydrous) maleic acid copolymer, ethylene/propylene, or the like, branched polyesters enhanced in acid value by trimellitic acid or the like, polyamides, and the like.

Liquid absorbing resin contains, for example, a neutralized salt structure (such as carboxylic acid). This neutralized salt structure such as carboxylic acid absorbs ink containing cations (monovalent metal cations such as Na and Li) to then form ionomer by the interaction with the cations.

It is also desirable that liquid absorbing resin contains substituted or unsubstituted amino group, and substituted or unsubstituted pyridine group. The groups bring the bactericidal effect and the interaction with a recording material (such as pigments and dyestuffs) having anionic groups.

Here, in liquid absorbing resin, the molar ratio (a hydrophilic monomer:a hydrophobic monomer) between a hydrophilic unit (a hydrophilic monomer) and a hydrophobic unit (a hydrophobic monomer) is, for example, 5:95 to 70:30.

Absorbing resin may be subject to ion cross-linking by ions supplied from ink. Specifically, units containing carboxylic acid can exist in water absorbing resin; a copolymer containing carboxylic acid such as (meth)acrylic acid and maleic acid, and (branched) polyester having carboxylic acid. Ion cross-linking and acid-base interaction are caused by carboxylic acid in the resin, and alkali metal cation, alkaline earth metal cation and organic amine onium cation supplied from liquid such as water-based ink.

With regard to liquid absorbing resin, solubility parameter (SP value) is a range of, for example, 9.5 or more (desirably 9.5 to 20, more desirably 9.5 to 15). In addition, the difference in solubility parameter (SP value) between liquid absorbing resin (hydrophilic polymer) and the after-mentioned liquid nonabsorbing resin (hydrophobic polymer) is a range of, for example, 1 or less (desirably 0.1 to 0.8, more desirably 0.2 to 0.6).

Solubility parameter (SP value) is a value calculated by the following calculation formula of Fedors for calculating by evaporation energy ($\Delta ei$) and molar volume ($\Delta vi$) of atom or atomic group of a chemical constitution. The same manner is performed hereinafter.

Calculation formula: (SP value=$(\Sigma\Delta ei/\Sigma\Delta vi)^{1/2}$)

Liquid absorbing resin described above is used while controlling the ratio of a hydrophilic monomer to the above-mentioned range even in the case of either form.

With regard to the particle diameter of hydrophilic polymer particles, in the case of using primary particles thereof as host particles, average spherical equivalent diameter is desirably from 0.1 to 50 μm, more desirably from 0.5 to 25 μm and far more desirably from 1 to 10 μm. On the other hand, in the case of composing composite particles, average spherical equivalent diameter is desirably from 10 nm to 30 μm, more desirably from 50 nm to 10 μm and far more desirably from 0.1 μm to 5 μm.

The ratio of hydrophilic polymer particles to the total ink receptive particles is desirably 75% or more, more desirably 85% or more and far more desirably from 90 to 99% at weight ratio.

Next, hydrophobic polymer is described. With regard to hydrophobic polymer (hereinafter referred to as liquid nonabsorbing resin), the ratio of a hydrophilic monomer to the total monomer components is 0 mol % or more and less than 10 mol %, desirably 0.1 mol % or more and 8 mol % or less, and more desirably 2 mol % or more and 5 mol % or less.

Examples of liquid nonabsorbing resin include a hydrophobic monomer singly or copolymers of plural kinds. Examples of a hydrophobic monomer include olefin compounds such as ethylene, propylene and butadiene, styrene derivatives such as styrene, α-methyl styrene, α-ethyl styrene and vinyltoluene, methyl methacrylate, ethyl methacrylate, butyl methacrylate, acrylonitrile, vinyl acetate, methyl acrylate, ethyl acrylate, butyl acrylate, lauryl methacrylate, vinylcyclohexane, vinylnaphthalene, vinylnaphthalene derivative, alkyl acrylate, phenyl acrylate, alkyl methacrylate, phenyl methacrylate, cycloalkyl methacrylate, alkyl crotonate, dialkyl itaconate, and dialkyl maleate.

Specific examples of liquid nonabsorbing resin appropriately include vinyl resin (such as styrene-(meth)acrylic acid copolymer and alkyl (meth)acrylate-(meth)acrylic acid copolymer), polyester resin (such as polyethylene terephthalate and polybutylene terephthalate), silicone resin (such as organopolysiloxane), and fluororesin (such as vinylidene fluoride resin, polytetrafluoroethylene, tetrafluoroethylene-perfluoroalkylvinyl copolymer and tetrafluoroethylene-ethylene copolymer).

Liquid nonabsorbing resin signifies resin having liquid absorbency capable of absorbing by less than 5% with respect to resin weight in the case of absorbing water as liquid.

With regard to liquid nonabsorbing resin, solubility parameter (SP value) is a range of, for example, less than 9.5 (desirably 7 to 9.5, more desirably 8.5 to 9.5).

Liquid nonabsorbing resin described above is used while controlling the ratio of a hydrophilic monomer to the above-mentioned range even in the case of either form.

The particle diameter of hydrophobic polymer particles is desirably 0.1 μm or less, more desirably 0.01 to 0.05 μm and far more desirably from 0.015 to 0.2 μm in average spherical equivalent diameter.

The ratio of hydrophobic polymer particles to the total ink receptive particles is desirably 0.1 to 5%, more desirably from 0.1 to 2.5% and far more desirably from 0.5 to 2% at weight ratio.

The ratio between hydrophobic polymer (liquid nonabsorbing resin) and the above-mentioned hydrophilic polymer (liquid absorbing resin) is a range of from 1:100 to 100:100 (desirably 1:100 to 50:100, more desirably from 10:100 to 33:100) at weight ratio.

The ratio of hydrophobic polymer particles to the total ink receptive particles is calculated in the following manner. Ink receptive particles are subjected to a dry sieving measuring apparatus (SONIC SIFTER L-200P/SPIN AIR SIEVE) and an air classifier (CLASSIEL N-01) to perform classification on the basis of particle diameter. The particles having small particle diameter are regarded as hydrophobic polymer particles and the particles having large particle diameter are regarded as hydrophilic polymer particles to calculate the ratio from weight ratio thereof. Also, ink receptive particles are dispersed in a liquid medium to measure particle-size distribution by using hydrodynamic chromatography, whereby the ratio between hydrophobic particles and hydrophilic particles can be calculated. The same manner is performed hereinafter.

Surface treatment (such as partial hydrophobizing treatment and specific functional group introducing treatment) may be performed for hydrophobic polymer particles containing and composed of hydrophobic polymer. Specifically, alkyl group can also be introduced by treating with sililation reagents such as trimethylchlorosilane and tert-butyldimethylchlorosilane. Dehydrochlorination is caused by sililation reagents to promote this reaction, so that the addition of amine can also change hydrochloric acid into hydrochloride to promote the reaction. Surface treatment with fatty alcohols, higher fatty acid and derivatives thereof can also be performed. In addition, surface treatment can also be performed with coupling agents having cationic functional group such as silane coupling agents having (substituted) amino group and quaternary ammonium salt structure, coupling agents having fluorine functional group such as fluorosilane, and coupling agents having anionic functional group such as carboxylic acid.

A charge control agent may be contained in hydrophobic polymer. Examples of a charge control agent include inorganic oxides, organic compounds and organic metal complexes.

Examples of inorganic oxides include titanium oxide, tin oxide, zinc oxide, alumina and silica. These inorganic oxides are preferably semiconductive (for example, a resistivity of $10^8 \Omega$/square or less).

Examples of organic compounds include resin particles, quaternary ammonium salt (for example, cetyl pyridyl chloride P-51 and P-53 (manufactured by Orient Chemical Industries, LTD.)), organic borates, imide compounds, imidazole compounds, bisphenol compounds, urea compounds and onium salt.

Examples of organic metal complexes include imidazole metal complexes, azo metal complex compounds (for example, S-44 and S-34 (manufactured by Orient Chemical Industries, LTD.)), benzoic acid metal complexes, salicylic acid metal complexes (for example, E-84 (manufactured by Orient Chemical Industries, LTD.)) and catechol metal complexes.

Examples of a charge control agent also include dyestuffs comprising complexes (complexes such as quaternary ammonium salt, nigrosine compounds, aluminum, iron and chromium), triphenylmethane pigment and resin type containing polar group.

These charge control agents are preferably, for example, particles having a spherical equivalent particle diameter of 200 μm or less.

Specific examples of a charge control agent include the following compounds. In the compounds, $R^1$ to $R^4$, each of which may be identical or different, denote hydrogen atom, substituted or unsubstituted alkyl group, or substituted or unsubstituted aryl group.

imido series

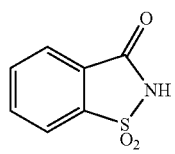

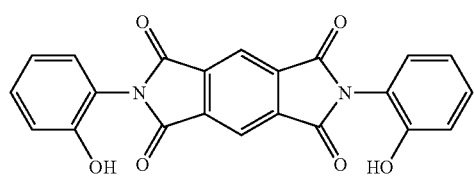

bisphenol series

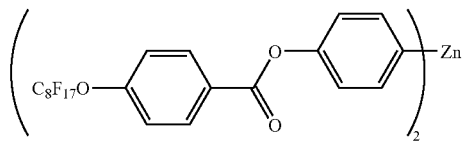

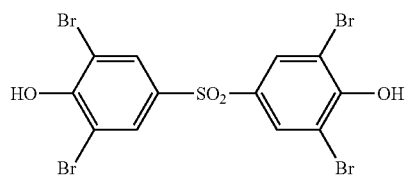

urea series

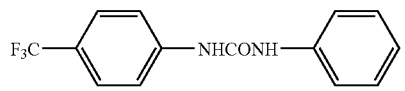

phosphoric acid series

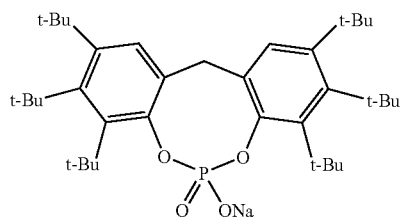

carboxylic acid series

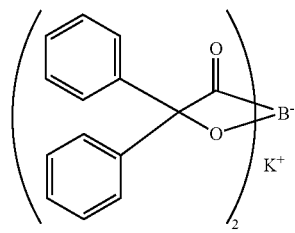

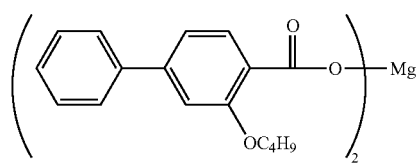

others

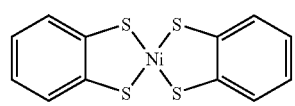

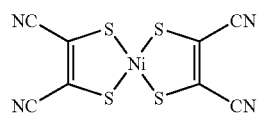

polymer/oligomer series

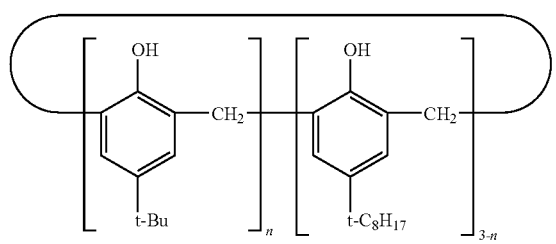

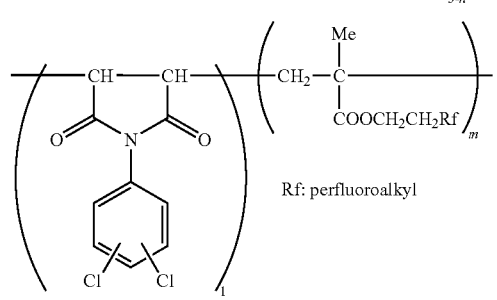

Rf: perfluoroalkyl

P-type onium series

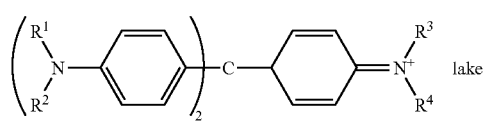

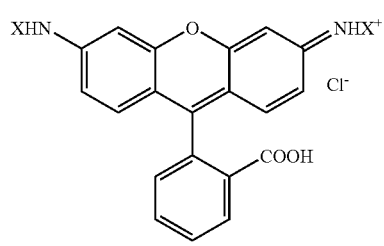

-continued
hetero-onium series
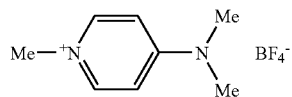
imidazole series
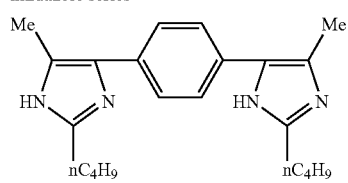
others
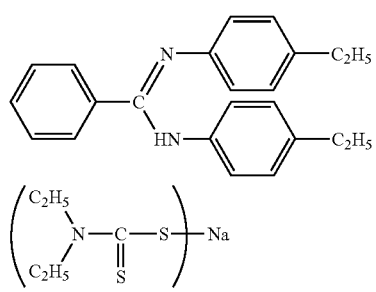
-continued
polymer/oligomer series
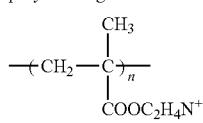
| Chemical Structure | brand name (company name) |
|---|---|
| N-type CCA | |
| 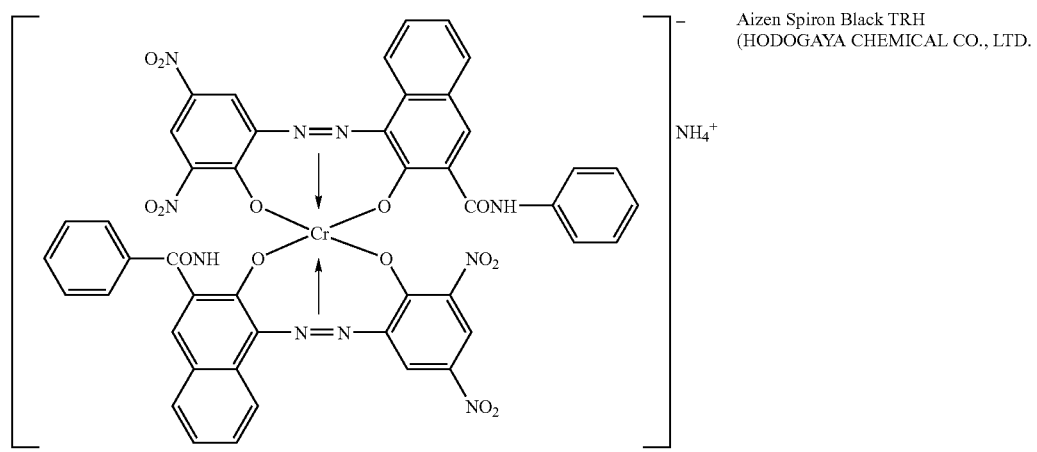 | Aizen Spiron Black TRH (HODOGAYA CHEMICAL CO., LTD. |

-continued
| Chemical Structure | brand name (company name) |
|---|---|
| 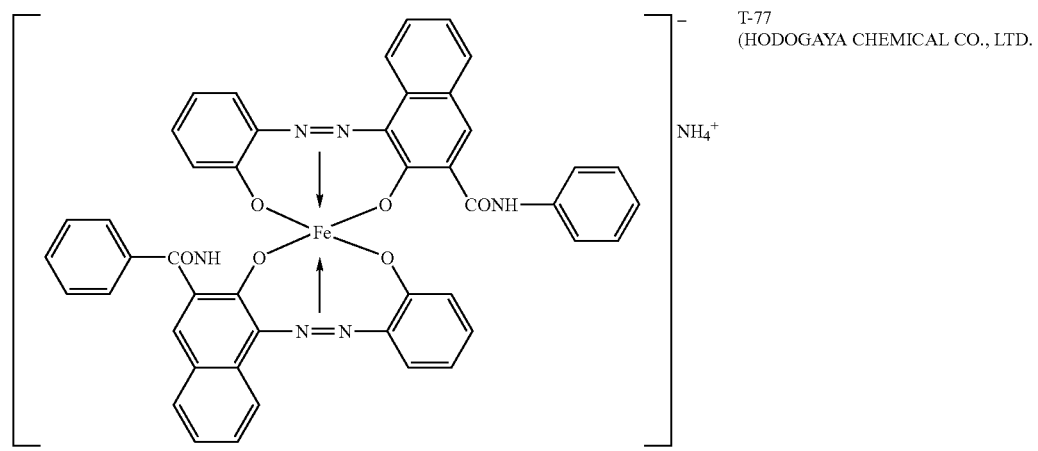 | T-77 (HODOGAYA CHEMICAL CO., LTD. |
| 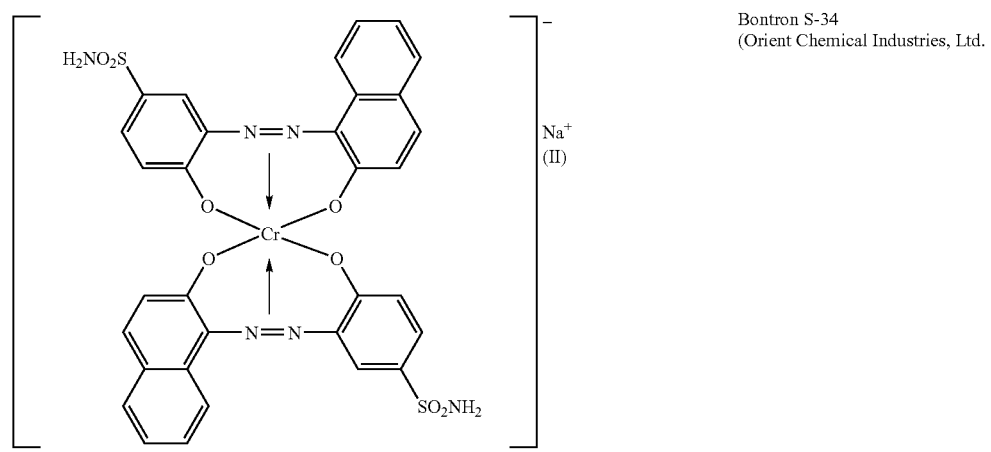 | Bontron S-34 (Orient Chemical Industries, Ltd. |
| 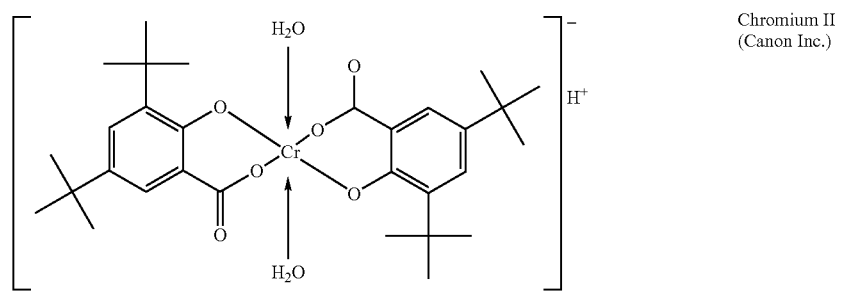 | Chromium II (Canon Inc.) |
P-type CCA
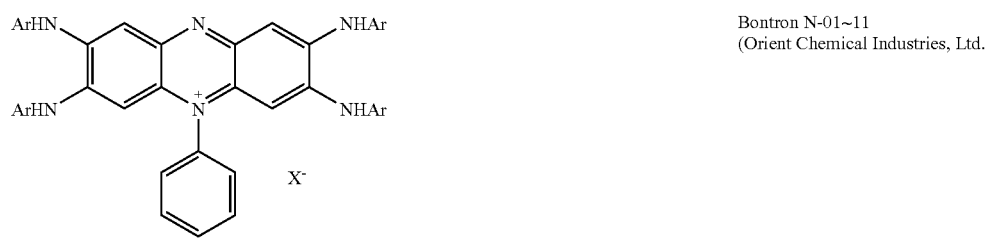
Bontron N-01~11 (Orient Chemical Industries, Ltd.)

| Chemical Structure | brand name (company name) |
|---|---|
| 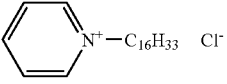 | TP-302 (HODOGAYA CHEMICAL CO., LTD. CPC (Canon Inc.) |

The content of a charge control agent is a range of, for example, 0.1 to 30% by weight (desirably 0.5 to 15% by weight, more desirably 0.5 to 5% by weight) with respect to hydrophobic polymer (liquid nonabsorbing resin).

Next, common properties to liquid absorbing resin composing hydrophilic polymer particles and liquid nonabsorbing resin (hereinafter referred to together as polymer) composing hydrophobic polymer particles are described.

Polymer may be of a straight-chain structure and yet is preferably of a branch structure. Polymer is desirably non-cross-linked or low cross-linked. Polymer may be a random copolymer and block copolymer of a straight-chain structure, and yet a polymer of a branch structure (including a random copolymer, block copolymer and graft copolymer of a branch structure) can be used therefor more appropriately. For example, in the case of polyester synthesized by polycondensation, terminal group can be increased by a branch structure. General methods for obtaining this branch structure are such as to add so-called crosslinking agent such as divinylbenzene and di(meth)acrylates during synthesis (for example, addition by less than 1%) and to synthesize by adding an initiator together with a crosslinking agent in large quantities.

A charge control agent for electrophotograph toner may further be added to polymer; low-molecular quaternary ammonium salts and organic borates, and halogenation compounds of salicylic acid derivatives. The addition of inorganic substances of conductivity (Here, conductivity signifies a volume resistivity of less than $10^7 \Omega \cdot cm$, for example. The same manner is performed hereinafter unless otherwise specified.) and semiconductivity (Here, semiconductivity signifies a volume resistivity of $10^7$ to $10^{13} \Omega \cdot cm$, for example. The same manner is performed hereinafter unless otherwise specified.) such as tin oxide and titanium oxide is effective for control of conductivity.

The polymer is preferred to be an amorphous resin, and its glass transition temperature (Tg) is, for example, 40 to 90 deg. C. When the glass transition temperature is within this range, the particle handling property, image blocking property, and imaging fixing property are satisfied at the same time. The glass transition temperature (and melting point) is determined from the major maximum peak measured in accordance with ASTMD 3418-8. The major maximum peak can be measured by using DSC-7 (manufactured by Perkin Elmer). In this apparatus, temperature of detection unit is corrected by melting point of indium and zinc, and the calorimetric value is corrected by using fusion heat of indium. For the sample, an aluminum pan is used, and for the control, an empty pan is set. Measurement is carried out at an elevated rate of temperature of 10 deg. C/min.

The weight-average molecular weight of the polymer is, for example, 3,000 to 300,000. When the weight-average molecular weight is within this range, quick liquid absorption, fixing at a low energy, and strength of image after fixing can be satisfied at the same time. The weight-average molecular weight is measured under the following conditions. For example, the GPC apparatus used is HLC-8120GPC, SC-8020 (manufactured by TOSOH CORPORATION), as the column, two pieces of TSK gel, SuperHM-H (manufactured by TOSOH CORPORATION, 6.0 mm ID×15 cm) are used, and the eluent is THF (tetrahydrofuran). The experiment can be carried out under the following conditions: the sample concentration of 0.5%, flow velocity of 0.6 ml/min, sample injection amount of 10 μl, measuring temperature of 40 deg. C, and IR detector. Calibration curve is prepared from ten samples of polystyrene standard samples TSK standards manufactured by TOSOH CORPORATION, A-500, F-1, F-10, F-80, F-380, A-2500, F-4, F-40, F-128 and F-700.

The acid value of the polymer may be 50 to 1000 as expressed by carboxylic acid groups (—COOH). The acid value as expressed by carboxylic acid groups (—COOH) can be measured as follows.

The acid value is measured by a neutralization titration method in accordance with JIS K 0070 (the disclosure of which is incorporated herein by reference). That is, a proper amount of sample is prepared, and to this sample, 100 ml of solvent (diethyl ether/ethanol mixture) is added together with several droplets of indicator (phenolphthalein solution). Then, the resulting mixture is stirred and mixed sufficiently in a water bath until the sample is dissolved. The solution is titrated with 0.1 mol/L of potassium hydroxide ethanol solution, and an end point is determined when a pale scarlet color of indicator continues for 30 seconds. Acid value A is calculated by the following equation:

$$A = (B \times f \times 5.611)/S$$

Next, inorganic particles composing composite particles together with hydrophilic polymer particles and inorganic particles attached to host particles together with hydrophobic polymer particles are described. Either of nonporous particles and porous particles can be used as inorganic particles. Examples of inorganic particles include colorless, light-colored or white particles (such as colloidal silica, alumina, calcium carbonate, zinc oxide, titanium oxide and tin oxide). Surface treatment (such as partial hydrophobizing treatment and specific functional group introducing treatment) may be performed for these inorganic particles. For example, in the case of silica, alkyl group is introduced by treating hydroxyl group of silica with sililation reagents such as trimethylchlorosilane and tert-butyldimethylchlorosilane. Dehydrochlorination is caused by sililation reagents to promote reaction. On this occasion, the addition of amine can also change hydrochloric acid into hydrochloride to promote the reaction. The control thereof can be performed by controlling treatment amount and treatment conditions of silane coupling agents having alkyl group and phenyl group as hydrophobic group, and coupling agents of titanate and zirconate. Surface treatment with fatty alcohols, higher fatty acid and derivatives thereof can also be performed. Surface treatment can also be performed with coupling agents having cationic functional group such as silane coupling agents having (substituted) amino group and quaternary ammonium salt structure, coupling agents having fluorine functional group such as fluorosilane, and coupling agents having anionic functional group such as carboxylic acid. These inorganic particles may be contained inside hydrophilic polymer particles, so-called, internally added.

The particle diameter of inorganic particles composing composite particles is 10 nm to 30 µm, desirably 50 nm to 10 µm and more desirably 0.1 µm to 5 µm in average spherical equivalent diameter. On the other hand, the particle diameter of inorganic particles attached to host particles is 10 nm to 1 µm, desirably 10 nm to 0.1 µm and more desirably 10 nm to 0.05 µm in average spherical equivalent diameter.

Next, other addition agents of ink receptive particles of the exemplary embodiments of the present invention are described. First, it is desirable that ink receptive particles of the sexemplary embodiments contain a component for aggregating or thickening an ink component.

The component having such functions may be contained as functional groups, or as compound in the water absorbing resin. Examples of such functional group include carboxylic acid, polyhydric metal cation, polyamine, and the like.

Preferred examples of such compound include aggregating agents such as inorganic electrolyte, organic acid, inorganic acid, organic amine, and the like.

Examples of the inorganic electrolyte includes an alkali metal ion such as a lithium ion, a sodium ion, a potassium ion, a polyvalent metal ion such as an aluminum ion, a barium ion, a calcium ion, a copper ion, an iron ion, a magnesium ion, a manganese ion, a nickel ion, a tin ion, a titanium ion and a zinc ion, hydrochloric acid, hydrobromic acid, hydriodic acid, sulfuric acid, nitric acid, phosphoric acid, thiocyanic acid, and an organic carboxylic acid such as acetic acid, oxalic acid, lactic acid, fumaric acid, citric acid, salicylic acid and benzoic acid, and organic sulfonic acid salts.

Specific examples of the inorganic electrolyte include an alkali metal salt such as lithium chloride, sodium chloride, potassium chloride, sodium bromide, potassium bromide, sodium iodide, potassium iodide, sodium sulfate, potassium nitrate, sodium acetate, potassium oxalate, sodium citrate, and potassium benzoate, and a polyvalent metal salt such as aluminum chloride, aluminum bromide, aluminum sulfate, aluminum nitrate, aluminum sodium sulfate, aluminum potassium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, ion iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

Examples of the organic acid include arginine acid, citric acid, glycine, glutamic acid, succinic acid, tartaric acid, cysteine, oxalic acid, fumaric acid, phthalic acid, maleic acid, malonic acid, lycine, malic acid, the compounds represented by Formula (1), and derivatives of the compounds.

Formula (1)

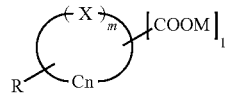

In the Formula (1), X represents O, CO, NH, $NR_1$, S or $SO_2$. $R_1$ represents an alkyl group and $R_1$ is preferably $CH_3$, $C_2H_5$ and $C_2H_4OH$. R represents an alkyl group and R is preferably $CH_3$, $C_2H_5$ and $C_2H_4OH$. R may be or may not be included in the Formula. X is preferably CO, NH, NR and O, and more preferably CO, NH and O. M represents a hydrogen atom, an alkali metal or amines. M is preferably H, Li, Na, K, monoethanol amine, diethanol amine or triethanol amine, is more preferably H, Na, and K, and is further preferably a hydrogen atom. n represents an integer of 3 to 7. n is preferably such a number that a heterocyclic ring is a six-membered ring or five-membered ring, and is more preferably such a number that the heterocyclic ring is a five-membered ring. m represents 1 or 2. A compound represented by the Formula (1) may be a saturated ring or an unsaturated ring when the compound is the heterocyclic ring. l represents an integer of 1 to 5.

Specific examples of the compound represented by the Formula (1) include the compound having any of furan, pyrrole, pyrroline, pyrrolidone, pyrone, pyrrole, thiophene, indole, pyridine, and quinoline structures, and furthermore, having a carboxyl group as a functional group. Specific examples of the compound include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolido-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethyl pyrrole-4-carboxylic acid, 2,4,5-trimethyl pyrrole-3-propionic acid, 3-hydroxy-2-indole carboxylic acid, 2,5-dioxo-4-methyl-3-pyrroline-3-propionic acid, 2-pyrrolidine carboxylic acid, 4-hydroxyproline, 1-methylpyrrolidine-2-carboxylic acid, 5-carboxy-1-methyl pyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acid, 1,2,5,6-tetrahydro-1-methyl nicotinic acid, 2-quinoline carboxylic acid, 4-quinoline carboxylic acid, 2-phenyl-4-quinoline carboxylic acid, 4-hydroxy-2-quinoline carboxylic acid, and 6-methoxy-4-quinoline carboxylic acid.

Preferable examples of the organic acid includes citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or the derivatives or salts thereof. The organic acid is more preferably pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or a derivative or salt thereof. The organic acid is further preferably pyrrolidone carboxylic acid, pyrone carboxylic acid, furan carboxylic acid, coumalic acid, or a derivatives or salts thereof.

An organic amine compound may be any of a primary amine, secondary amine, tertiary amine, quaternary amine or salts thereof. Specific examples of the organic amine compound include a tetraalkyl ammonium, alkylamine, benzalconium, alkylpyridium, imidazolium, polyamine and derivatives or salts thereof. Specific examples of the organic amine include amyl amine, butyl amine, propanol amine, propyl amine, ethanol amine, ethyl ethanol amine, 2-ethyl hexyl amine, ethyl methyl amine, ethyl benzyl amine, ethylene diamine, octyl amine, oleyl amine, cyclooctyl amine, cyclobutyl amine, cyclopropyl amine, cyclohexyl amine, diisopropanol amine, diethanol amine, diethyl amine, di-2-ethylhexyl amine, diethylene triamine, diphenyl amine, dibutyl amine, dipropyl amine, dihexyl amine, dipentyl amine, 3-(dimethyl amino) propyl amine, dimethyl ethyl amine, dimethyl ethylene diamine, dimethyl octyl amine, 1,3-dimethyl butyl amine, dimethyl-1,3-propane diamine, dimethyl hexyl amine, amino butanol, amino propanol, amino propane diol, N-acetyl amino ethanol, 2-(2-amino ethyl amino)-ethanol, 2-amino-2-ethyl-1,3-propane diol, 2-(2-amino ethoxy) ethanol, 2-(3,4-dimethoxy phenyl) ethyl amine, cetyl amine, triisopropanol amine, triisopentyl amine, triethanol amine, trioctyl amine, trityl amine, bis (2-aminoethyl) 1,3-propane diamine, bis (3-aminopropyl) ethylene diamine, bis (3-aminopropyl) 1,3-propane diamine, bis (3-amino propyl) methyl amine, bis (2-ethyl hexyl) amine, bis (trimethyl silyl) amine, butyl amine, butyl isopropyl amine, propane diamine, propyl diamine, hexyl amine, pentyl amine, 2-methyl-cyclohexyl amine, methyl-propyl amine, methyl benzyl amine, monoethanol amine, lauryl amine, nonyl amine, trimethyl amine, triethyl amine, dimethyl propyl amine, propylene diamine, hexamethylene diamine, tetraethylene pentamine, diethyl ethanol amine, tetramethyl ammonium chloride, tetraethyl ammonium bromide, dihydroxy ethyl stearyl amine, 2-heptadecenyl-hydroxyethyl imidazoline, lauryl dimethyl benzyl ammonium chloride, cetylpyridinium chloride, stearamid methyl pyridium chloride, a diaryl dimethyl ammonium chloride polymer, a diaryl amine polymer, and a monoaryl amine polymer.

More preferably, there are used triethanol amine, triisopropanol amine, 2-amino-2-ethyl-1,3-propanediol, ethanol amine, propane diamine, and propyl amine as the organic amine compound.

Among these aggregating agents, polyvalent metal salts, such as $Ca(NO_3)$, $Mg(NO_3)$, $Al(OH_3)$, a polyaluminum chloride, and the like are preferable.

The aggregating agents may either be used alone or two or more kinds of the aggregating agents may be mixed and used. The content of the aggregating agent is preferably 0.01% by mass to 30% by mass, more preferably 0.1% by mass to 15% by mass, and further preferably 1% by mass to 15% by mass.

A releasing agent is preferably contained in ink receptive particles of the exemplary embodiments. A releasing agent may be contained in the above-mentioned polymer or particles of a releasing agent may be compounded and contained together with polymer particles.

Examples of such releasing agent include low molecular polyolefins such as polyethylene, polypropylene, polybutene, or the like; silicones having softening point by heating; fatty acid amides such as oleic amide, erucic amide, ricinoleic amide, stearic amide, or the like; vegetable wax such as carnauba wax, rice wax, candelilla wax, Japan wax, jojoba oil, or the like; animal wax such as beeswax, or the like; mineral or petroleum wax such as montan wax, ozokerite, ceresin, paraffin wax, microcrystalline wax, Fischer-Tropsch wax, or the like; and modifications thereof. Among them, crystalline compound is preferred.

In exemplary embodiments of the present invention, in addition to any constitution of items <1> to <11>, with regard to the particle diameter of host particles, average spherical equivalent diameter is desirably from 0.1 to 50 µm, more desirably from 0.5 to 25 µm and far more desirably 1 to 10 µm.

Average spherical equivalent diameter in the above-mentioned range achieves high image quality as compared with the case of not having this constitution.

In addition to any constitution of items <1> to <11>, with regard to hydrophilic polymer particles, the ratio of a hydrophilic monomer to the total monomer components is from 10 mol % or more to 90 mol % or less, desirably from 15 mol % or more to 85 mol % or less, and more desirably from 30 mol % or more to 80 mol % or less.

When the ratio of a hydrophilic monomer is in the above-mentioned range, ink is trapped by a gap in and between particles at high speed as compared with the case of not having this constitution, so that various inks can be received at high speed. Printing at high speed can be performed.

In addition to any constitution of items <1> to <11>, hydrophilic polymer particles appropriately contain weak liquid absorbing resin. This weak liquid absorbing resin signifies liquid absorbing resin capable of absorbing by approximately several % (≈5%) to several hundreds % (≈500%), desirably 5% to 100% with respect to resin weight, for example, in the case of absorbing water as liquid.

The case where liquid absorbency of weak liquid absorbing resin is less than 5% decreases ink retention capability of ink receptive particles, while the case where liquid absorbency thereof is more than 500% activates moisture absorption of ink receptive particles to increase environmental dependence.

In addition to any constitution of claims 1 to 11, with regard to hydrophobic polymer particles, the ratio of a hydrophilic monomer to the total monomer components is 0 mol % or more and less than 10 mol %, desirably 0.1 mol % or more and 8 mol % or less, and more desirably 2 mol % or more and 5 mol % or less.

In the case where ink receptive particles are stored and hydrophilic polymer particles contained in host particles absorb moisture in the atmosphere, and in the case where ink receptive particles absorb a liquid component of ink, electrification characteristics on an ink receptive particle surface are secured for the reason that the ratio of a hydrophilic monomer is in the above-mentioned range. Also, ink receptive particles can be supplied to an intermediate transfer body, and an image with image disorder restrained can be formed without any separation of ink receptive particles from an intermediate transfer body.

(Material for Recording)

A material for recording of the exemplary embodiments is provided with ink containing at least a recording material and the above-mentioned ink receptive particles of the exemplary embodiments. The material for recording can record in such a manner that the ink receptive particles receive ink and thereafter are transferred to a recording medium.

The ink is described below in detail. Both water-based ink and oil-based ink can be used, but from the environmental viewpoint, water-based ink is preferred. The water-based ink (hereinafter called the ink) contains, in addition to a recording material, an ink solvent (for example, water or water soluble organic solvent). As required, other additives may be also contained.

Next, the recording material will be explained. Examples of the recording material generally include colorants. As the colorant, either a dye or a pigment can be used, but, a pigment is preferable. As the pigment, either an organic pigment or an inorganic pigment can be used. Examples of the black pigment include carbon black pigments such as a furnace black, a lamp black, an acetylene black, and a channel black. In addition to black and three primary colors of cyan, magenta and yellow, specific color pigments of red, green blue, brown, white, or the like, metal glossy pigments of gold, silver, or the like, colorless or pale color extender pigments, plastic pigments, or the like may be used. Moreover, a pigment newly synthesized for the invention may be used as well.

Moreover, particles prepared by fixing a dye or a pigment onto the surface of silica, alumina, polymer beads, or the like as the core, an insoluble lake product of a dye, a colored emulsion, a colored latex, or the like can also be used as a pigment.

Specific examples of the black pigment used in the present invention include RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080 and RAVEN 1060 (manufactured by Columbian Carbon Company); REGAL 400R, REGAL 330R, REGAL 660R, MOGUL L, Black Pearls L, MONARCH 700, MONARCH 800, MONARCH 880, MONARCH 900, MONARCH 1000, MONARCH 1100, MONARCH 1300 and MONARCH 1400 (manufactured by Cabot Corporation): Color Black FW1, Color Black FW2, Color Black FW2V, Color Black 18, Color Black FW200, Color Black S150, Color Black S160, Color Black S170, PRINTEX 35, PRINTEX U, PRINTEX V, PRINTEX 140U, PRINTEX 140V, Special Black 6, Special Black 5, Special Black 4A and Special Black 4 (manufactured by Degussa Co.): and No. 25, No. 33, No. 40, No. 47, No. 52, No. 900, No. 2300, MCF-88, MA 600, MA 7, MA 8 and MA 100 (manufactured by Mitsubishi Chemical Co., Ltd.). However, the pigments are not restricted thereto.

While specific examples of the cyan color pigments include C.I. Pigment Blue-1, -2, -3, -15, -15:1, -15:2, -15:3, -15:4, -16, -22 and -60, the pigments are not restricted thereto.

While specific examples of the magenta color pigments include C.I. Pigment Red-5, -7, -12, -48, -48:1, -57, -112, -122, -123, -146, -168, -177, -184, -202, and C.I. Pigment Violet-19, the pigments are not restricted thereto.

While specific examples of the yellow color pigments include C.I. Pigment Yellow-1, -2, -3, -12, -13, -14, -16, -17, -73, -74, -75, -83, 93, -95, -97, -98, -114, 128, -129, -138, -151, -154 and -180, the pigments are not restricted thereto.

Here, in the case a pigment is used as the colorant, it is preferable to use a pigment dispersing agent in a combination thereof. As a usable pigment dispersing agent, a polymer dispersing agent, an anionic surfactant, a cationic surfactant, an amphoteric surfactant, a nonionic surfactant, and the like are exemplified.

As the polymer dispersing agent, a polymer having a hydrophilic structure part and a hydrophobic structure part can preferably be used. As the polymer having a hydrophilic structure part and a hydrophobic structure part, a condensation-based polymer and an addition polymer can be used. As the condensation-based polymer, known polyester based dispersing agents can be exemplified. As the addition polymer, addition polymers of monomers having an $\alpha,\beta$-ethylenically unsaturated group can be exemplified. By copolymerizing optionally a monomer having an $\alpha,\beta$-ethylenically unsaturated group having a hydrophilic group and a monomer having an $\alpha,\beta$-ethylenically unsaturated group having a hydrophobic group in combination, a targeted polymer dispersing agent can be obtained. Moreover, a homopolymer of monomers having an $\alpha,\beta$-ethylenically unsaturated group having a hydrophilic group can be used as well.

As the monomer having an $\alpha,\beta$-ethylenically unsaturated group having a hydrophilic group, monomers having a carboxyl group, a sulfonic acid group, a hydroxyl group, a phosphoric acid group, or the like, such as acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylic amide, methacryloxy ethyl phosphate, bismethacryloxy ethyl phosphate, methacryloxy ethyl phenyl acid phosphate, ethylene glycol dimethacrylate, and diethylene glycol dimethacrylate can be exemplified.

As the monomer having an $\alpha,\beta$-ethylenically unsaturated group having a hydrophobic group, styrene derivatives such as styrene, methylstyrene and vinyl toluene, vinyl cyclohexane, vinyl naphthalene, vinyl naphthalene derivatives, alkyl acrylate, alkyl methacrylate, phenyl methacrylate, cycloalkyl methacrylate, alkyl crotonate, dialkyl itaconate, dialkyl maleate and the like are exemplified.

Preferable examples of the copolymer which is used as a polymer dispersant include styrene-styrene sulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer. Polymers obtained by appropriately polymerizing a monomer having a polyoxyethylene group or a hydroxyl group to these polymers may be used.

The above-mentioned polymer dispersing agent includes the polymer dispersant having a weight average molecular weight of 2,000 to 50,000.

These pigment dispersing agents may either be used alone or two or more kinds in combination. Although the addition amount of the pigment dispersing agent varies with the types of the pigments largely, in general, it is added at a ratio of 0.1 to 100% by mass in total with respect to the pigment.

A self-dispersible pigment in water can be used as a colorant. The self-dispersible pigment in water used in the present invention refers to the pigment having many water-solubilizing groups on the surface of the pigment, which can be stably dispersed in water without adding any polymer dispersant. The self-dispersible pigment in water is practically obtained by applying surface modification treatments such as an acid or a base treatment, a coupling agent treatment, a polymer graft treatment, a plasma treatment or a redox treatment on so-called usual pigments.

As a self-dispersible pigment in water, in addition to the surface-modified pigments described above, commercially available pigments such as CAB-O-JET-200, CAB-O-JET-300, IJX-157, IJX-253, IJX-266, IJX-273, IJX-444, IJX-55, and CABOT 260 (manufactured by Cabot Corporation), and MICROJET BLACK CW-1 and CW-2 (manufactured by Orient Chemical Industries, Ltd.) may also be used as the self-dispersible pigment in water.

As the self dispersing pigment, a pigment having as a functional group at least a sulfonic acid, a sulfonate, a carboxylic acid, or a carboxylate on the surface thereof is preferable. A pigment having as a functional group at least a sulfonic acid or a sulfonate on the surface thereof is more preferable.

Further, the pigment coated with a resin may be used as the colorant. Such pigment is called as microcapsule pigments, which include commercially available microcapsule pigments manufactured by Dainippon Ink & Chemicals, Inc. and Toyo Ink MFG Co., Ltd. as well as microcapsule pigments prepared for use in the present invention.

Moreover, a resin dispersing type pigment with a polymer substance chemically bonded with the above-mentioned pigment can also be used.

Other examples of recording material include hydrophilic anionic dye, direct dye, cationic dye, reactive dye, high molecular dye, oil-soluble dye, other dyes, wax powder and resin powder colored by dye, emulsions, fluorescent dye or fluorescent pigment, infrared absorber, ultraviolet absorber, ferrite, magnetite, other ferromagnetic materials and magnetic materials, titanium oxide, zinc oxide, other semiconductor and photo catalysts, organic and inorganic electronic material particles.

The content (concentration) of the recording material is, for example, 5% by weight to 30% by weight.

The volume average particle size of the colorant is, for example, 10 nm or more and 1,000 nm or less.

The volume average particle size of the colorant denotes the particle size of the colorant itself, or when an additive such as a dispersing agent is adhered onto the colorant, the particle size with the additive adhered. In the invention, as the device for measuring the volume average particle size, MICROTRUCK UPA particle size analysis meter 9340 (produced by Leeds & Northrup Corp.) is used. The measurement is carried out with 4 ml of an ink for an inkjet placed in a measurement cell according to a predetermined measuring method. As the parameters to be inputted at the time of the measurement, the viscosity of the ink for an inkjet is inputted as the viscosity, and the density of the colorant is inputted as the density of the dispersion particles Next, a water-soluble organic solvent will be mentioned. As a water-soluble organic solvent, polyhydric alcohols, a polyhydric alcohol derivative, a nitrogen-containing solvent, alcohols and a sulfur-containing solvent, and the like may be used.

Specific examples of a water-soluble organic solvent include polyhydric alcohols such as ethylene glycol, diethylene glycol, propylene glycol, butylene glycol, triethylene glycol, 1,5-pentanediol, 1,2-hexanediol, 1,2,6-hexanetriol, glycerin and trimethylolpropane, sugar alcohols such as xylitol, and saccharides such as xylose, glucose and galactose.

Specific examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and the ethylene oxide adduct of diglycerin.

Specific examples of the nitrogen-containing solvent include pyrrolidone, N-methyl-2-pyrrolidone, cyclohexyl pyrrolidone, triethanol amine. Specific examples of the alcohols include ethanol, isopropyl alcohol, butyl alcohol, and benzyl alcohol. Specific examples of the sulfur-containing solvent include thiodiethanol, thiodiglycerol, sulfolane, and dimethyl sulfoxide.

It is also possible to use propylene carbonate, ethylene carbonate, or the like as a water-soluble organic solvent.

It is preferable that at least one kind of water-soluble organic solvent is used. The content of the water-soluble organic solvent to be used may be 1% by mass or more and 70% by mass or less.

Next, water will be explained. As the water, in order to prevent introduction of impurities, it is particularly preferable to use ion exchange water, ultra pure water, distilled water or ultrafiltrated water.

Next, other additives will be explained. A surfactant may be added to the ink.

As the kinds of the surfactants, various kinds of anionic surfactants, nonionic surfactants, cationic surfactants, and amphoteric surfactants, or the like are exemplified. Preferably, the anionic surfactants and the nonionic surfactants can be used.

Hereinafter, specific examples of the surfactant are mentioned.

Examples of the anionic surfactant may include alkylbenzenesulfonic acid salt, alkylphenylsulfonic acid salt, alkylnaphthalenesulfonic acid salt, higher fatty acid salt, sulfuric acid ester salt of higher fatty acid ester, sulfonic acid salt of higher fatty acid ester, sulfuric acid ester salt and sulfonic acid salt of higher alcohol ether, higher alkylsulfosuccinic acid salt, polyoxyethylenealkyl ethercarboxylic acid salt, polyoxyethylenealkyl ethersulfuric acid salt, alkylphosphoric acid salt and polyoxyethylenealkyl etherphosphoric acid salt, preferably dodecylbenzenesulfonic acid salt, isopropylnaphthalenesulfonic acid salt, monobutylphenylphenol monosulfonic acid salt, monobutylbiphenylsulfonic acid salt, monobutylbiphenylsulfonic acid salt and dibutylphenylphenoldisulfonic acid salt.

Examples of the nonionic surfactant may include polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glycerine fatty acid ester, polyoxyethyleneglycerine fatty acid ester, polyglycerine fatty acid ester, sucrose fatty acid ester, polyoxyethylenealkylamine, polyoxyethylene fatty acid amide, alkylalkanol amide, polyethyleneglycolpolypropyleneglycol block copolymer, acetylene glycol and polyoxyethylene adduct of acetylene glycol, preferably polyoxyethylene adducts such as polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide, polyethyleneglycol polypropyleneglycol block copolymer, acetylene glycol and polyoxyethylene adduct of acetylene glycol.

In addition, silicone surfactants such as polysiloxaneoxyethylene adduct, fluorine-based surfactants such as perfluoroalkyl carboxylic acid salt, perfluoroalkyl sulfonic acid salt and oxyethylene perfluoroalkyl ether, biosurfactants such as spiculisporic acid, rhamnolipid and lysolecithin.

These surfactants may be used solely or as a mixture. The HLB of the surfactant is preferably in the range of 3 to 20 in view of dissolving stability, or the like.

The amount of the surfactant to be added is preferably 0.001% by weight to 5% by weight, and more preferably 0.01% by weight to 3% by weight.

Furthermore, additionally, various additives can be added to the ink, such as a permeating agent, or polyethylene imine, polyamines, a polyvinyl pyrrolidone, a polyethylene glycol, en ethyl cellulose, and a carboxy methyl cellulose, in order to adjust the permeation property, or in order to control the ink ejection property, and compounds of alkali metals such as a potassium hydroxide, a sodium hydroxide and a lithium hydroxide for adjusting the conductivity and the pH. As needed, a pH buffer, an antioxidant, a mildew preventing agent, a viscosity adjusting agent, a conductive agent, an ultraviolet ray absorbing agent, a chelating agent, or the like can be added as well.

Preferred characteristics of the ink are described. First of all, the surface tension of the ink is preferred to be 20 to 45 mN/m.

Here, as the surface tension, the value measured under the conditions of 23□C, and 55% RH by the use of the WILL-HERMY type surface tension meter (produced by Kyowa Kaimen Kagaku Corp.) is used.

The ink viscosity is preferred to be 1.5 to 30 mPa·s.

The viscosity is a value measured by using RHEOMAT 115 (manufactured by Contraves), at measuring temperature of 23° C., and the shearing speed of 1400 s-1.

The ink composition is not particularly limited to the above, and may include other functional materials such as a crystal material and electronic material, as well as the recording material.

(Ink Receptive Particle Storage Cartridge)

The ink receptive particle storage cartridge of an exemplary embodiment in the invention is detachably disposed in the recording apparatus, and the ink receptive particle storage cartridge is used for holding the ink receptive particles of the invention, and for supplying the ink receptive particles to a particle applying device (particle supply device) of the recording apparatus. By detaching the cartridge from the recording apparatus, the ink receptive particles can be easily added to the recording apparatus.

Figure 3:
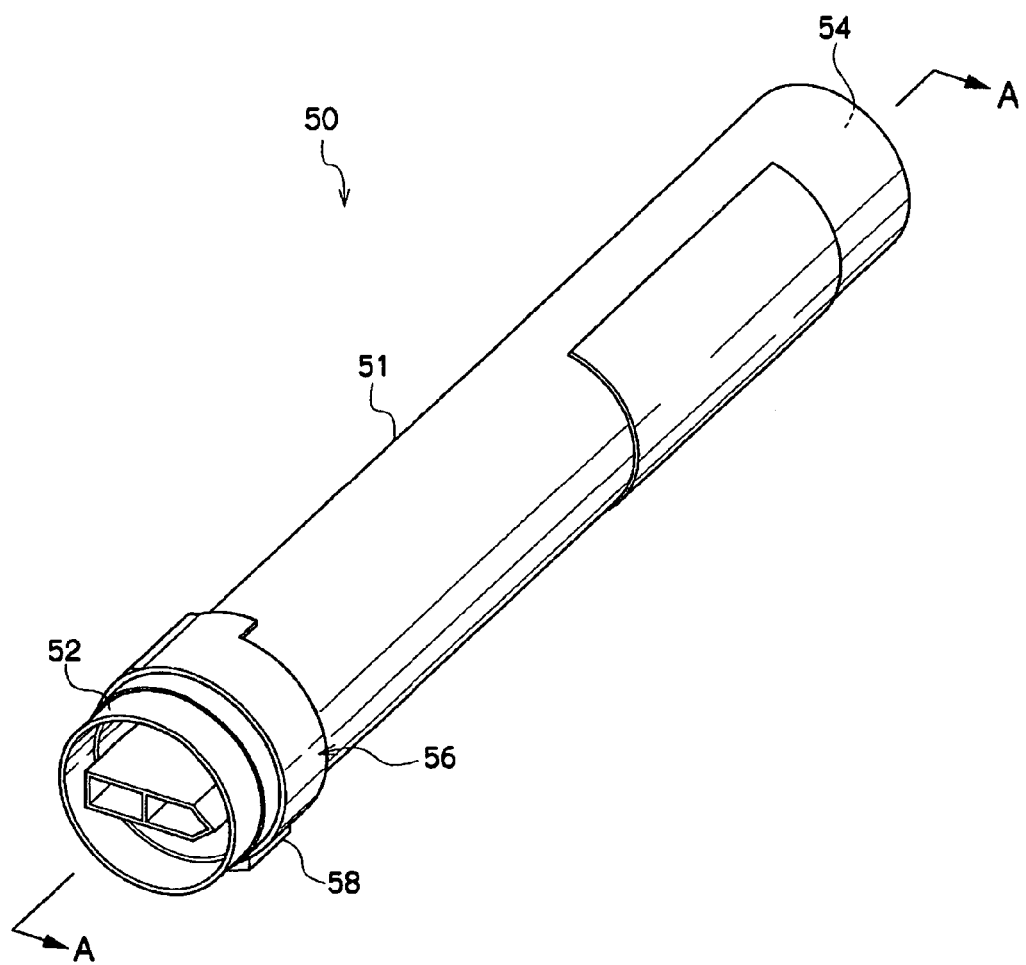
FIG. 3 is a perspective view showing an ink receptive particle storage cartridge according to an exemplary embodiment.
Figure 4:
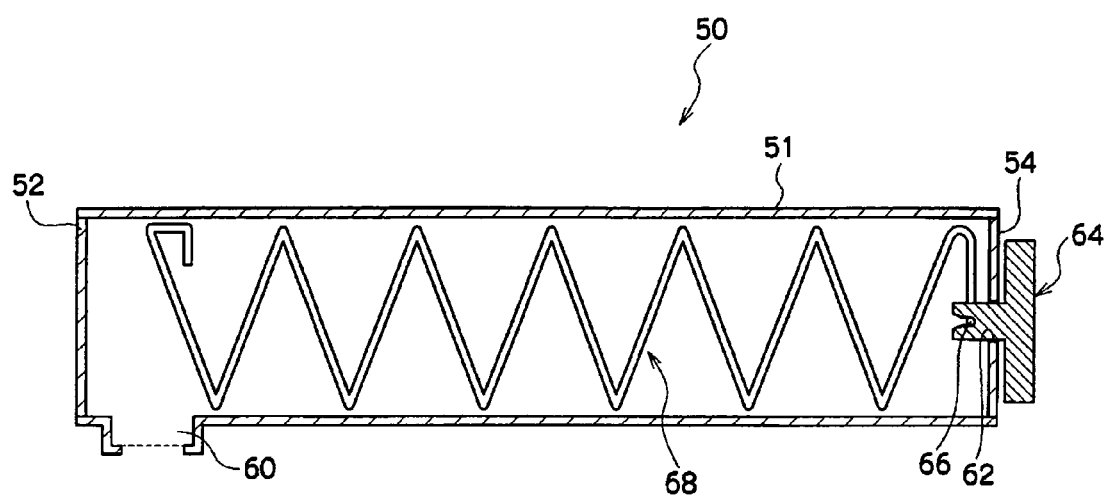
FIG. 4 is an A-A cross-sectional view of FIG. 3.

An exemplary embodiment of the ink receptive particle storage cartridge of the invention is described by reference to drawings. FIG. 3 is a perspective view of the ink receptive particle storage cartridge in an exemplary embodiment. FIG. 4 is a sectional view A-A in FIG. 10.

As shown in FIG. 3 and FIG. 4, an ink receptive particle storage cartridge 50 of the exemplary embodiment comprises a cylindrical particle storage cartridge main body 51, and side walls 52, 54 fitted to both ends of the particle storage cartridge main body 51.

A discharge port 60 is provided on a surface the particle storage cartridge main body 51 at one end, for ejecting ink receptive particles toward the particle applying device (particle supply device; not shown) of the recording apparatus. A belt 56 is slidably provided on the particle storage cartridge main body 51. This belt 56 has a storage unit 58 for accommodating the discharge ports 60 at the outer side of the discharge port 60.

Therefore, when the particle storage cartridge 50 is not installed in the recording apparatus (or right after installing), the storage unit 58 accommodates the discharge port 60 so that the ink absorptive particles contained in the particle storage cartridge main body 51 are unlikely to leak from the discharge port 60.

A hole 62 is provided in the center part of the side wall 54 at the other end of the particle storage cartridge main body 51. A junction 66 of a coupling 64 penetrates from the hole 62 of side wall 54 into the inside of particle storage cartridge main body 51. As a result, the coupling 64 is free to rotate on the side wall 54.

An agitator 68 is disposed nearly in an entire area of particle storage cartridge main body 51. The agitator 68 is a metal linear member, for example, stainless steel (SUS304WP), and is formed in a spiral shape. One end of the agitator is bent in a vertical direction toward the rotary shaft (center of rotation), and is coupled to the junction 66 of the coupling 64. Other end is a free end, being free from restraint.

The agitator 68 receives torque from the junction 66 of the coupling 64, and is put in rotation, and conveys the ink receptive particles in the particle storage cartridge main body 51 toward the discharge port 60 while agitating. Thus, by discharging the particles from the discharge port 60, the recording apparatus can be refilled with ink receptive particles.

The ink receptive particle storage cartridge of the invention is not limited to the example explained above.

(Recording Method, Recording Apparatus)

The recording method (recording apparatus) of an exemplary embodiment is a recording method (recording apparatus) using the ink containing a recording material, and the ink receptive particles of the invention, and includes receiving the ink in the ink receptive particles (receiving unit or discharge unit), and transferring the ink receptive particles having received the ink onto a recording medium (transfer unit). The recording method (recording apparatus) may further include fixing the ink receptive particles transferred on the recording medium Specifically, for example, from a supply unit, the ink receptive particles are supplied on an intermediate body in a layer form. On the supplied layer of ink receptive particles (that is, ink receptive particle layer), ink is discharged from the ink discharge unit to be received. The ink receptive particle layer having received the ink is transferred from the intermediate body onto a recording medium by the transfer unit. Entire area of the ink receptive particle layer may be transferred, or only a selected recording area (ink receiving area) may be transferred. The ink receptive particle layer transferred on the recording medium is pressurized (or heated and pressurized) and fixed by the fixing unit, as necessary. Thus, the image is recorded by the ink receptive particles having received the ink. Transfer and fixing may be done also simultaneously.

In order to receive the ink, the ink receptive layers are formed, for example, in a layer, and the thickness of ink receptive particle layer is preferred to be 1 μm to 100 μm, more preferably 3 μm to 60 μm, and still more preferably 5 μm to 30 μm. The porosity of ink receptive particle layer (that is, porosity of voids between ink receptive particles+porosity of voids in ink receptive particles (trap structure)) is preferably 10% to 80%, more preferably 30% to 70%, and still more preferably 40% to 60%.

On the surface of the intermediate body, a releasing agent may be applied preliminarily before supply of the ink receptive particles. As a result, the transfer property of ink receptive particle layer is improved. Examples of such releasing agent include (modified) silicone oil, fluorine oil, hydrocarbon oil, mineral oil, vegetable oil, polyalkylene glycol, alkylene glycol ether, alkane diol, fused wax, etc. The recording medium may be either permeable medium (such as plain paper or coated paper) or impermeable medium (such as resin film). The recording medium is not limited to these examples, and may include semiconductor substrate and other industrial products.

The recording medium may be either permeable medium (such as plain paper or coated paper) or impermeable medium (such as resin film). The recording medium is not limited to these examples, and may include semiconductor substrate and other industrial products.

Figure 5:
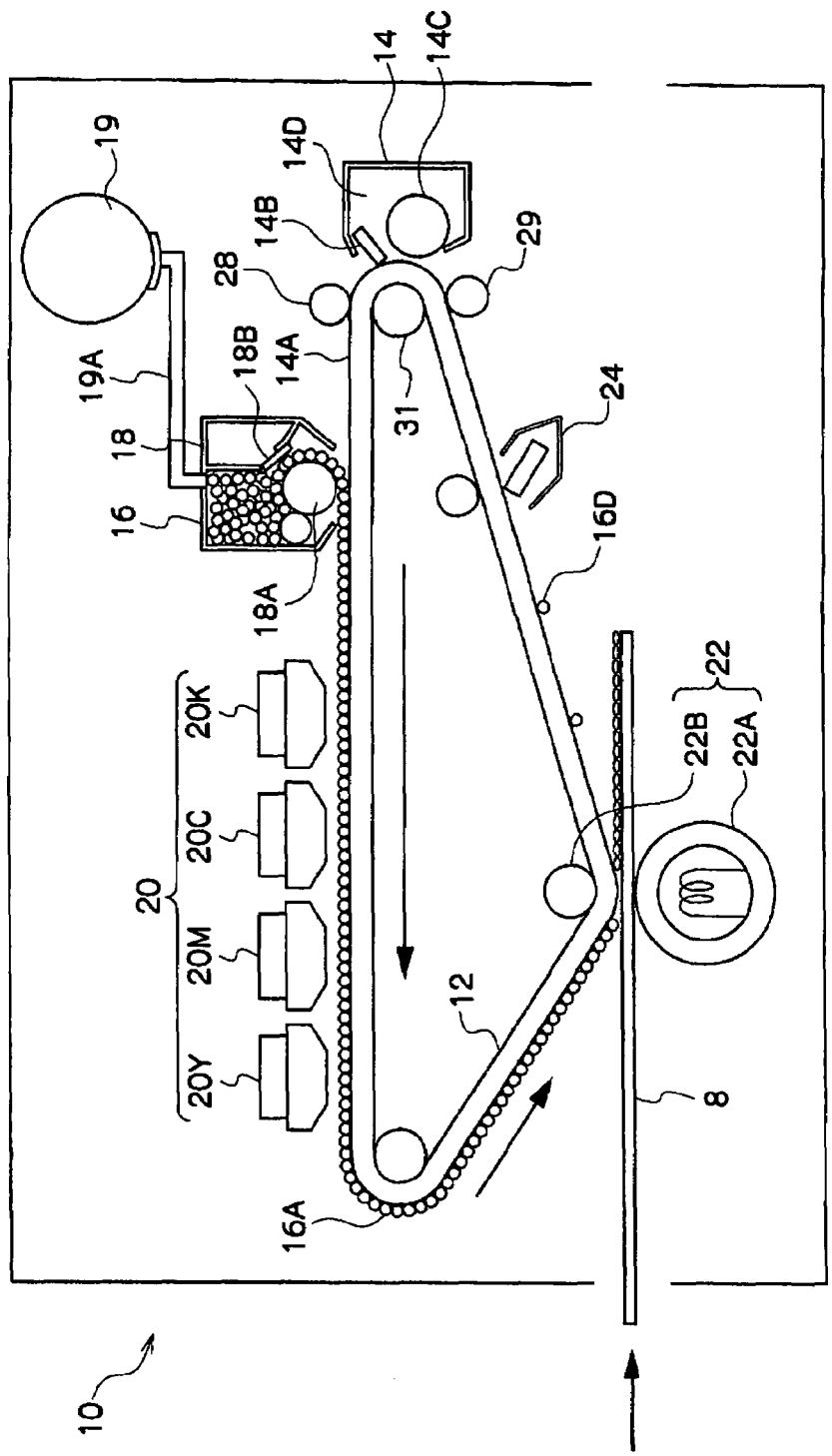
FIG. 5 is a block diagram showing a recording apparatus according to an exemplary embodiment.
Figure 6:
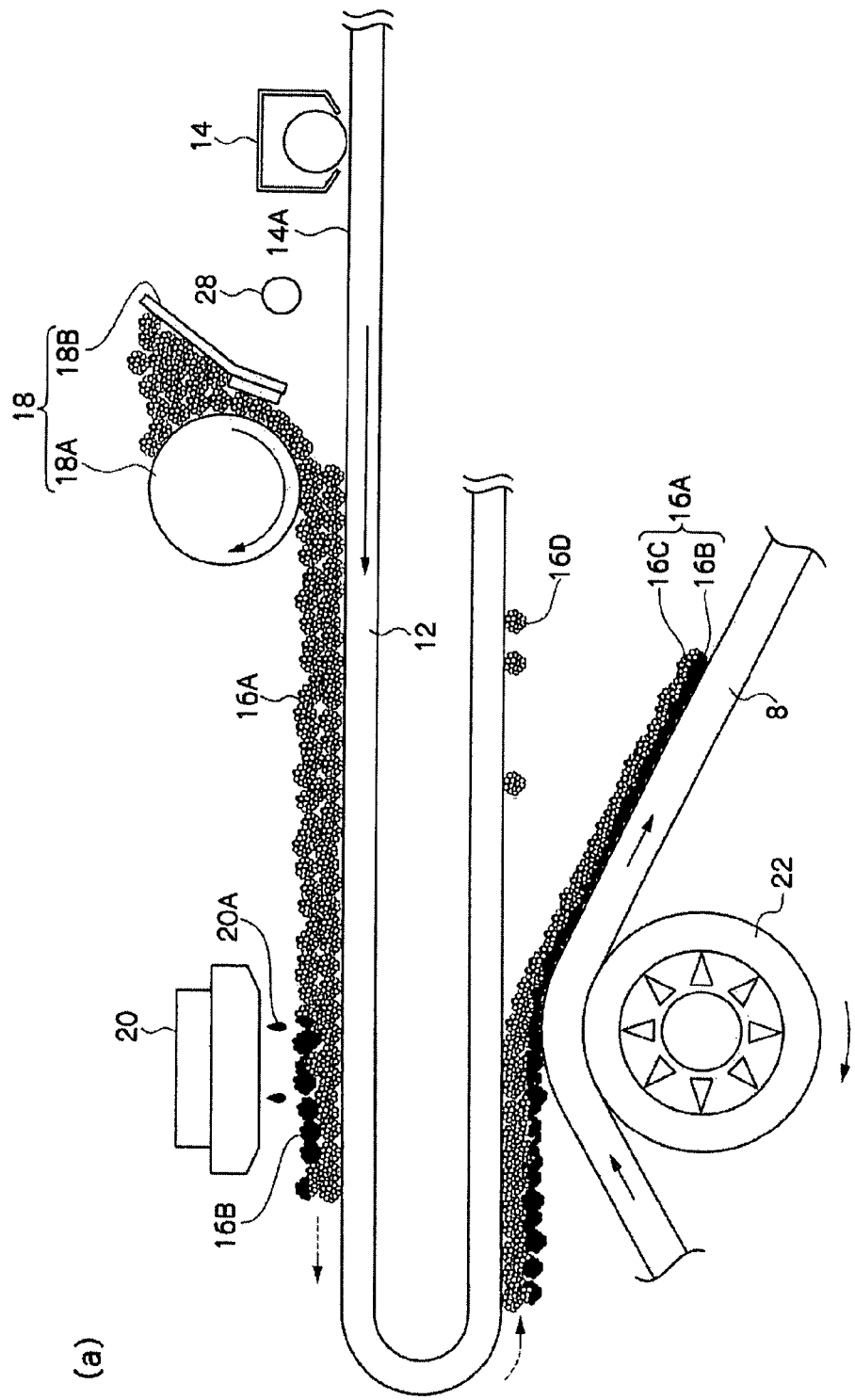
FIG. 6 is a block diagram showing the principal part of a recording apparatus according to an exemplary embodiment.
Figure 7:
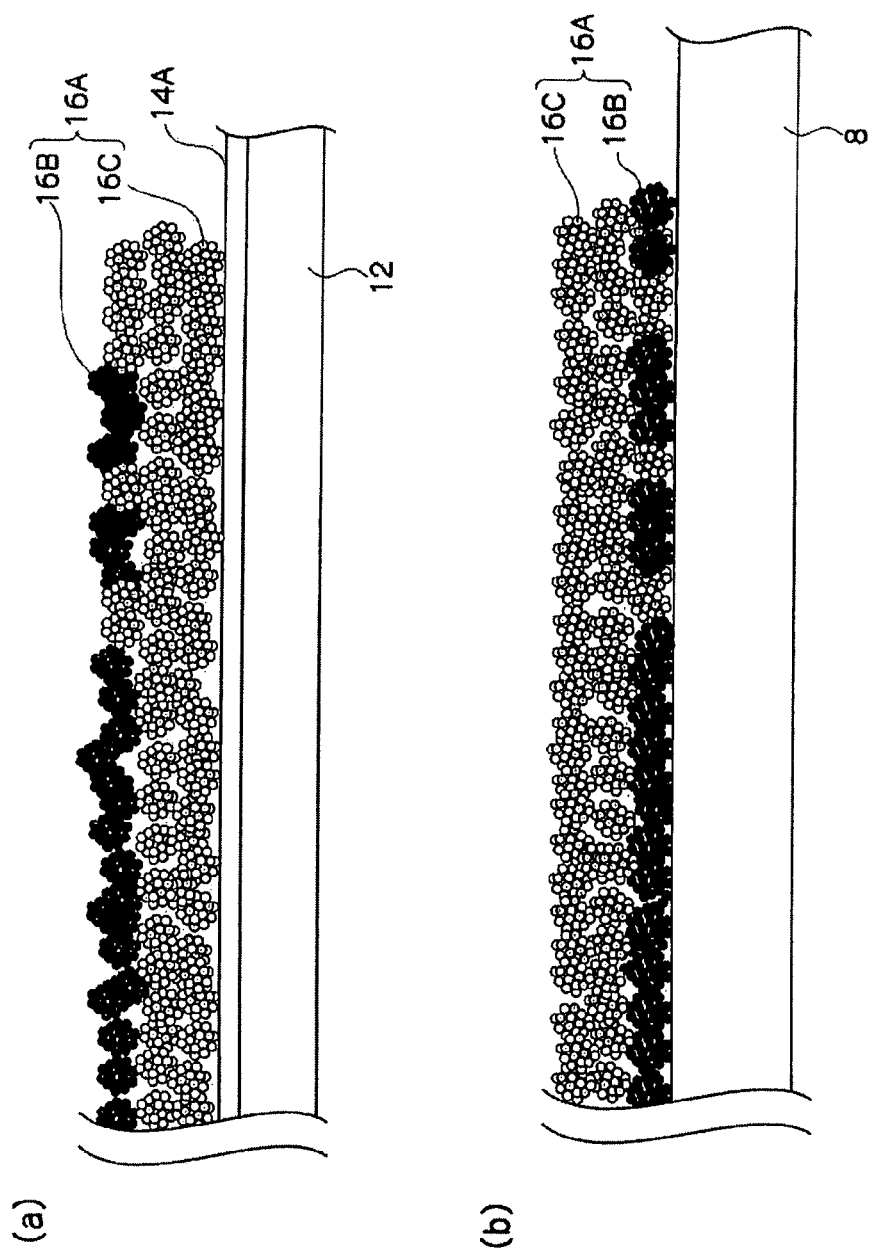
FIG. 7 is a block diagram showing an ink receptive particle layer according to an exemplary embodiment.

Exemplary embodiments of a recording apparatus of the exemplary embodiments are hereinafter described while referring to the figures. FIG. 5 is a block diagram showing a recording apparatus according to an exemplary embodiment. FIG. 6 is a block diagram showing the principal part of a recording apparatus according to an exemplary embodiment. FIG. 7 is a block diagram showing an ink receptive particle layer according to an exemplary embodiment. The case where composite particles are applied to host particles as ink receptive particles is described in the following exemplary embodiments.

As shown in FIG. 5, a recording apparatus 10 of an exemplary embodiment comprises an endless belt-shaped intermediate transfer body 12, a charging device 28 for charging the surface of the intermediate transfer body 12, a particle applying device 18 for forming a particle layer by adhering ink receptive particles 16 in a uniform and a specified thickness onto a charged region on the intermediate transfer body 12, an ink jet recording head 20 for forming an image by ejecting ink droplets onto the particle layer, and a transfer fixing device 22 for transferring and fixing an ink receptive particle layer on a recording medium 8 by overlapping the intermediate transfer body 12 with the recording medium 8 and by applying pressure and heat. I μn a particle applying device 18, an ink receptive particle storage cartridge 19 may be detachably coupled to the particle applying device 18 with a supply tube 19A provided there between.

At the upstream side of charging device 28, a releasing agent applying device 14 is disposed for forming a releasing layer 14A for promoting releasing of an ink receptive particle layer 16A from the surface of intermediate transfer body 12, in order to enhance transfer efficiency of ink receptive particle layer 16A onto the recording medium 8 from the surface of intermediate transfer body 12.

An electric charge is formed on the surface of intermediate transfer body 12 by the charging device 28, and on the charged surface of the intermediate transfer body 12. On the particle layer, ink droplets in each color are ejected from ink jet recording heads 20 of individual colors, that is, 20K, 20C, 20M, 20Y, and a color image is formed.

The ink receptive particle layer on which the color image layer is formed is transferred onto the recording medium 8 in each color images by the transfer fixing device (transfer fixing roll) 22. At the downstream side of the transfer fixing device 22, a cleaning device 24 is disposed for removing deposits sticking onto the intermediate transfer body such as ink receptive particles 16 remained on the surface of intermediate transfer body 12, and foreign matter (paper dust of recording medium 8 or the like) other than particles.

The recording medium 8 on which the color image is transferred is directly conveyed out, and the surface of the intermediate transfer body 12 is charged again by charging device 28. At this time, ink receptive particles 16 transferred onto the recording medium 8 absorb and hold the ink droplets 20A, and can be discharged quickly, and the productivity of the apparatus as a whole can be enhanced as compared with the conventional method of absorbing ink in the recording medium 8.

As required, a neutralization apparatus 29 may be installed between the cleaning device 24 and the releasing agent applying device 14 in order to remove the residual electric charge on the surface of the intermediate transfer body 12.

In the recording apparatus of an exemplary embodiment, the intermediate transfer body 12 is composed of a base layer of polyimide film of 1 mm in thickness, on which a surface layer of ethylene propylene diene monomer (EPDM) rubber of 400 μm in thickness is formed. Herein, the surface resistivity is preferably approximately 10E13 ohms/square, and the volume resistivity is approximately 10E12 ohms-cm (semi-conductivity).

The intermediate transfer body 12 is moved to convey, and a releasing layer 14A is formed on the intermediate transfer body 12 by the releasing agent applying device 14. A releasing agent 14D is applied on the surface of the intermediate transfer body 12 by an application roller 14C of the releasing agent applying device 14, and the layer thickness is regulated by the blade 14B.

At this time, in order to form image and print continuously, the releasing agent applying device 14 may be formed to continuously contact with the intermediate transfer body 12, or may be appropriately separated from the intermediate transfer body 12.

From an independent liquid supply system (not shown), a releasing agent 14D may be supplied into the applying device, so that the supply of releasing agent 14D is not interrupted. In this exemplary embodiment, amino silicone oil is used as releasing agent 14D.

By applying a positive charge onto the surface of intermediate transfer body 12 by the charging device 28, a positive charge is applied onto the surface of intermediate transfer body 12. A potential capable of supplying and adsorbing ink receptive particles 16 onto the surface of intermediate transfer body 12 may be formed by an electrostatic force of electric field which can be formed between the ink receptive particle supply roll 18A of ink receptive particle applying device 18 and the surface of intermediate transfer body 12.

In the exemplary embodiments of the invention, using the charging device 28, a voltage is applied between the charging device 28 and a driven roll 31 (connected to ground), between which the intermediate transfer body 12 is disposed, and the surface of the intermediate transfer body 12 is charged.

The charging device 28 is a roll shape member adjusted to a volume resistivity of 10 E 6 to 10 E 8 ohms-cm which forms an elastic layer (foamed urethane resin) dispersed with a conductive material on the outer circumference of stainless steel bar material. The surface of elastic layer is coated with a skin layer (PFA) of water-repellent and oil-repellent property of approximately 5 to 100 μm in thickness.

A power source is connected to the charging device 28, and the driven roll 31 is electrically connected to the frame ground. The charging device 28 is driven together with the driven roll 31, while the intermediate transfer body 12 is disposed between the charging device 28 and the driven roll 31, and at the pressed position, since a specified potential difference occurs against the grounded driven roll 31, an electric charge can be applied onto the surface of the intermediate transfer body 12. Here, a DC voltage of 1 kV (constant voltage control) is applied onto the surface of intermediate transfer body 12 by the charging device 28, and the surface of the intermediate transfer body 12 is charged.

The charging device 28 may be composed of corotron or brush.

Ink receptive particles 16 are supplied from the particle applying device 18 onto the surface of the intermediate transfer body 12, and an ink receptive particle layer 16A is formed. The particle applying device 18 has an ink receptive particle supply roll 18A in the portion facing the intermediate transfer body 12 in the container containing the ink receptive particles 16, and a charging blade 18B is disposed so as to press the ink receptive particle supply roll 18A. The charging blade 18B also functions to regulate the film thickness of the ink receptive particles 16 applied and adhered onto the surface of the ink receptive particle supply roll 18A.

Ink receptive particles 16 are supplied by ink receptive particle supply roll 18A (conductive roll), and the ink receptive particle layer 16A is regulated by the charging blade 18B, and is charged negatively with the reverse polarity of the electric charge on the surface of the intermediate transfer body 12. The supply rolls 18A is aluminum solid rolls, and the charging blades 18B is made of metal plates (such as SUS, or the like) being coated with urethane rubber or the like in order to apply pressure. The charging blade 18B is contacting with a supply roll 18A in a type of doctor blades.

The charged ink receptive particles 16 form, for example, approximately one layer of particles on the surface of the ink receptive particle supply roll 18A, and are conveyed to a position opposite to the surface of intermediate transfer body 12. When closing to the intermediate transfer body 12, the charged ink receptive particles 16 are moved electrostatically onto the surface of intermediate transfer body 12 by the electric field formed by the potential difference on the surfaces of the ink receptive particle supply roll 18A and the intermediate transfer body 12

At this time, the relative ratio (peripheral speed ratio) of moving speed of intermediate transfer body 12 and rotating speed of supply roll 18A are determined such that approximately one layer of particles on the surface of intermediate transfer body 12. This peripheral speed ratio depends on the charging amount of intermediate transfer body 12, charging amount of ink receptive particles 16, relative position of supply roll 18A and intermediate transfer body 12, and other parameters.

The number of particles supplied to an intermediate transfer body 12 can be increased by relatively gaining the peripheral speed of a supply roll 18A on the basis of peripheral speed ratio for forming the above-mentioned single-layer ink receptive particle layer 16A. It is desirable that layer thickness is made into the minimum required thickness (for example, 1 to 5 μm) in the case where image density to be transferred is low (ink load is small (for example, 0.1 to 1.5 g/m$^2$)), while layer thickness is controlled for becoming thickness (for example, 10 to 25 μm) enough to be capable of retaining an ink liquid component (solvent and dispersion medium) in the case where image density is high (ink load is high (for example, 4 to 15 g/m$^2$)).

For example, in the case of a character image with small ink load, when image formation is performed for a single-layer ink receptive particle layer on an intermediate transfer body, an image formation material (pigment) in ink is trapped by an ink receptive particle layer surface on the intermediate transfer body and fixed to a particle gap on and in an ink receptive particle surface so that the distribution becomes low in the depth direction, Image forming process of a recording apparatus according to exemplary embodiments is hereinafter described in further detail. In a recording apparatus according to the exemplary embodiments, as shown in FIG. 6, a releasing layer 14A can be formed on the surface of the intermediate transfer body 12 by a releasing agent applying device 14. If raw materials of the intermediate transfer body 12 are aluminum and PET base, the releasing layer 14A is particularly desirably formed. Alternatively, the surface itself of the intermediate transfer body 12 may have releasability by using raw materials of fluororesin and silicone rubber.

Next, the surface of intermediate transfer body 12 is charged with the reverse polarity of the ink receptive particles 16 by the charging device 28. As a result, the ink receptive particles 16 supplied by the supply roll 18A of the particle applying device 18 can be adsorbed electrostatically, and a uniform layer of ink receptive particles 16 can be formed on the surface of the intermediate transfer body 12.

Further, on the surface of the intermediate transfer body 12, ink receptive particles 16 are formed as a uniform layer by the supply roll 18A of the particle applying device 18. For example, the ink receptive particle layer 16A is formed such that a thickness thereof corresponds to substantially three layers of particles. That is, the particle layer 16A is regulated to a desired thickness by the gap between the charging blade 18B and supply roll 18A, and thus, the thickness of the particle layer 16A transferred on the recording medium 8 is regulated. Or it may be regulated by the peripheral speed ratio of supply roll 18A and intermediate transfer body 12.

Ink droplets 20A are discharged on the formed ink receptive particle layer 16A by an ink jet recording head 20 in each color driven by piezoelectric type (piezo), thermal type and the like to form an image layer 16B on the ink receptive particle layer 16A. The ink droplets 20A discharged from the ink jet recording head 20 are loaded into the ink receptive particle layer 16A, and then an ink liquid component is promptly absorbed in voids between the ink receptive particles 16 and gaps composing the ink receptive particles 16, and a recording material (such as pigment) is also trapped by the surface of the ink receptive particles 16 (composing particles) or gaps between particles composing the ink receptive particles 16.

At this time, an ink liquid component (solvent and dispersion medium) contained in the ink droplets 20A permeates in the ink receptive particle layer 16A, but yet a recording material such as pigment is trapped by the surface of the ink receptive particles 16 or gaps between particles. That is, an ink liquid component (solvent and dispersion medium) may permeate through the back surface of the ink receptive particle layer 16A, but yet a recording material such as pigment does not permeate through the back surface of the ink receptive particle layer 16A. Thus, on the occasion of being transferred to a recording medium 8, a particle layer 16C in which a recording material such as pigment does not permeate forms a layer on the image layer 16B, so that this particle layer 16C becomes a protective layer for confining the surface of the image layer 16B and an image to whose surface a recording material (a coloring material such as pigment) is not exposed can be formed.

Subsequently, a color image is formed on the recording medium 8 by transferring/fixing the ink receptive particle layer 16A with the image layer 16B formed from the intermediate transfer body 12 to the recording medium 8. The ink receptive particle layer 16A on the intermediate transfer body 12 is heated/pressurized by a transfer fixing device (a transfer fixing roll) 22 heated by a heating means such as a heater, and transferred to the recording medium 8.

At this time, as described later, the adjustment of heating/pressurization may regulate irregularities on an image surface and control glossness. The performance of cooling peeling may control glossness.

Residual particles 16D remaining on the surface of the intermediate transfer body 12 after the ink receptive particle layer 16A was peeled are recovered by a cleaning device 24 (refer to FIG. 5), and the surface of the intermediate transfer body 12 is electrified again by a charging device 28, and then the ink receptive particles 16 are supplied thereto to form the ink receptive particle layer 16A.

Here, a particle layer used for image formation according to the exemplary embodiments is shown in FIG. 7. As shown in FIG. 7(a), the releasing layer 14A is formed on the surface of the intermediate transfer body 12.

Subsequently, the ink receptive particles 16 are formed as a layer on the surface of the intermediate transfer body 12 by a particle applying device 18. It is desirable that the ink receptive particle layer 16A formed as described above has a thickness such that the ink receptive particles 16 are superposed by approximately three layers. The control of the ink receptive particle layer 16A to desirable thickness controls the thickness of the ink receptive particle layer 16A transferred to the recording medium 8. At this time, the surface of the ink receptive particle layer 16A is leveled off to such a degree as to bring no hindrance to image formation (formation of the image layer 16B) by the discharge of the ink droplets 20A.

A recording material such as pigment contained in the discharged ink droplets 20A permeates through approximately one third to a half of the ink receptive particle layer 16A as shown in FIG. 7(a), and the particle layer 16C through which a recording material such as pigment does not permeate remains thereunder.

With regard to the ink receptive particle layer 16A formed on the recording medium 8 with heating/pressurization transference by the transfer fixing device (the transfer fixing roll) 22, the particle layer 16C containing no ink exists on the image layer 16B as shown in FIG. 7(b), and acts as a kind of a protective layer for the reason that the image layer 16B does not directly appear on the surface. Thus, the ink receptive particles 16 at least after being fixed need to be transparent.

The particle layer 16C is heated/pressurized by the transfer fixing device (the transfer fixing roll) 22, so that the surface thereof can be flattened out and glossness of an image surface can also be controlled by heating/pressurization.

The drying of an ink liquid component (solvent and dispersion medium) trapped inside the ink receptive particles 16 by heating may be promoted.

An ink liquid component (solvent and dispersion medium) received/retained by the ink receptive particle layer 16A is retained in the ink receptive particle layer 16A also after being transferred and fixed, and removed by natural seasoning.

The image formation is finished through the above-mentioned process. The intermediate transfer body 12 may be removed by the cleaning device 24 in the case where the residual particles 16D remaining on the intermediate transfer body 12 and a foreign matter such as paper powder separated from the recording medium 8 exists after transferring the ink receptive particles 16 to the recording medium 8.

A neutralization apparatus 29 may be disposed in the downstream side of the cleaning device 24. For example, a conductive roll is used as the neutralization apparatus 29, and the intermediate transfer body 12 is put between the conductive roll and a driven roll 31 (grounding), and then a voltage of approximately ±3 kV and 500 Hz is impressed on the surface thereof to neutralize the surface of the intermediate transfer body 12.

With regard to other conditions of various devices such as the above-mentioned charge voltage, particle layer thickness and fixing temperature, optimum conditions thereof are determined by the ink receptive particles 16, ink composition or ink discharge amount, so that each of the conditions is optimized.

<Each Component>

Next, a component in each step of exemplary embodiments is described in detail.

<Intermediate Transfer Body>

The intermediate transfer body 12 on which the ink receptive particle layer is formed may be either belt as in the first exemplary embodiment, or cylindrical (drum) as in the fourth exemplary embodiment. To supply and hold ink receptive particles on the surface of intermediate transfer body by an electrostatic force, the outer circumferential surface of the intermediate transfer body must have particle holding property of semiconductive or insulating properties. As electric characteristics for the surface of the intermediate transfer body, it is required to use a material having surface resistance of 10E10 to 14 ohms/square and volume resistivity of 10E9 to 13 ohm-cm in the case of the semiconductive property, and surface resistance of 10E14 ohms/square and volume resistivity of 10E13 ohm-cm in the case of the insulating property.

In the case of belt shape, the base material is not particularly limited as far as it is capable of rotating and driving a belt in the apparatus and has the mechanical strength needed to withstand the rotating and driving, and it has the heat resistance needed to withstand heat when heat is used in transfer/fixing. Specific examples of the substrate are polyimide, polyamide imide, aramid resin, polyethylene terephthalate, polyester, polyether sulfone, and stainless steel.

In the case of drum shape, the base material includes aluminum or stainless steel or the like.

To enhance transfer efficiency of the ink receptive particles 16 (for efficient transfer from intermediate transfer body 12 to recording medium 8), preferably, a releasing layer 14A is formed on the surface of intermediate transfer body 12. The releasing layer 14A may be formed either as surface (material) of the intermediate transfer body 12, or the releasing layer 14A may be formed on the surface of the intermediate transfer body 12 according to the manner of on-process by adding externally.

That is, when the surface of intermediate transfer body 12 is a releasing layer 14A, it is preferred to use fluorine based resins such as tetrafluoroethylene-ethylene copolymer, polyvinylidene fluoride, tetrafluoroethylene-perfluoroalkyl vinyl ether copolymer, tetrafluoroethylene-hexafluoropropylene copolymer, or the like, or elastic materials such as silicone rubber, fluorosilicone rubber, or phenyl silicone rubber.

When forming the releasing layer 14A by external addition, an aluminum of which surface is anodized is used in the case of drum shape, or the same base materials as those for the belt is used in the case of belt shape, or when an elastic material is formed (for either drum shape or belt shape), silicone rubber, fluorosilicone rubber, phenyl silicone rubber, fluororubber, chloroprene rubber, nitrile rubber, ethylene propylene rubber, styrene rubber, isoprene rubber, butadiene rubber, ethylene propylene butadiene rubber, and nitrile butadiene rubber.

In order to apply heating system by electromagnetic induction to the fixing process in the transfer fixing device (transfer fixing roll) 22, a heat generating layer may be formed on the intermediate transfer body 12, not on the transfer fixing device 22. The heat generating layer is made of a metal causing electromagnetic induction action. For example, nickel, iron, copper, aluminum or chromium may be used selectively.

<Particle Supply Process>

On the surface of the intermediate transfer body 12, an ink receptive particle layer 16A of ink receptive particles 16 is formed. At this time, as the method of forming an ink receptive particle layer 16A of the ink receptive particles 16, a general method of supplying an electrophotographic toner on a photoreceptor may be applied. That is, a charge is supplied in advance on the surface of intermediate transfer body 12 by general charging for an electrophotographic method (charging by a charging device 28 or the like). The ink receptive particles 16 are frictionally charged so as to make a counter charge to the charge on the surface of the intermediate transfer body 12 (one-component frictional charging method or two-component method).

Ink receptive particles 16 held on the supply roll 18A in FIG. 14A form an electric field together with the surface of intermediate transfer body 12, and are moved/supplied onto the intermediate transfer body 12 and held thereon by an electrostatic force. At this time, by the thickness of image layer 16B formed on the particle layer 16A of the ink receptive particles 16 (depending on an amount of the ink to be applied), the thickness of particle layer 16A of the ink receptive particles 16 can be also controlled. Absolute value of the charging amount of the ink receptive particles 16 is preferred to be in a range of 5 µc/g to 50 µc/g.

A particle supply process corresponding to one-component development system will be explained below.

The ink receptive particles 16 are supplied on a supply roll 18A, and charged by a charging blade 18B while the thickness of particle layer is regulated.

The charging blade 18B has a function of regulating the layer thickness of the ink receptive particles 16 on the surface of the supply roll 18A, and can change the layer thickness of the ink receptive particles 16 on the surface of the supply roll 18A by varying the pressure on the supply roll 18A. By controlling the layer thickness of the ink receptive particles 16 on the surface of the supply roll 18A to substantially one layer, the layer thickness of the ink receptive particles 16 formed on the surface of the intermediate transfer body 12 can be formed in substantially one layer. By controlling the pressing force on the charging blade 18B to be low, the layer thickness of the ink receptive particles 16 formed on the surface of the supply roll 18A can be increased, and the thickness of particle layer 16A of the ink receptive particles 16 formed on the surface of the intermediate transfer body 12 can be increased.

In other methods, when the peripheral speed of intermediate transfer body 12 and supply roll 18A forming approximately one layer of particle layers on the surface of intermediate transfer body 12 to be 1, by increasing the peripheral speed of supply roll 18A, the number of ink receptive particles 16 supplied on the intermediate transfer body 12 can be increased, and it can be controlled so as to increase the thickness of particle layer 16A on the intermediate transfer body 12. Further, the layer thickness can be regulated by combining the above methods. In this configuration, for example, the ink receptive particles 16 are charged negatively, and the surface of intermediate transfer body 12 is charged positively.

By thus controlling the layer thickness of ink receptive particle layer 16A, consumption of ink receptive particle layer 16A is suppressed, and a pattern of which the surface consistently covered with a protective layer may be formed.

As the charging roll 18 in the charging device, it is possible to use a roll of 10 to 25 mm in diameter, having an elastic layer dispersed with a conductive material on the outer surface of bar or pipe member which is made of aluminum, stainless steel or the like, and having volume resistivity adjusted to approximately 10E6 to 10E8 ohm-cm.

The elastic layer includes resin material a single layer or mixture of two or more resin materials, such as urethane resin, thermoplastic elastomer, epichlorhydrine rubber, ethylene-propylene-diene copolymer rubber, silicon system rubber, acrylonitrile-butadiene copolymer rubber, or polynorbornene rubber. These resin materials may be used alone or mixture of two or more resin materials may be used. A preferred material is a foamed urethane resin.

The foamed urethane resin is preferably a resin having closed cell structure formed by mixing and dispersing a hollow body such as hollow glass beads or microcapsules of thermal expansion type in a urethane resin.

Further, the surface of elastic layer may be coated with a water repellent skin layer of 5 to 100 µm in thickness.

A DC power source is connected to the charging device 28, and a driven roll 31 is electrically connected to the frame ground. The charging device 28 is driven while the intermediate transfer body 12 is placed between the charging device 28 and the driven roll 31. At the pressing position, since a specified potential difference is generated between the charging device 28 and the grounded driven roll 31, an electrical charge can be applied.

<Marking Process>

Ink droplets 20A are ejected from the ink jet recording head 20 based on an image signal, on the layer (particle layer 16A) of ink receptive particles 16 formed on the surface of intermediate transfer body 12 (particle layer 16A), and an image is formed. Ink droplets 20A ejected from the ink jet recording head 20 are implanted in the particle layer 16A of the ink receptive particles 16, and ink droplets 20A are quickly absorbed in the viods 16G formed in the ink receptive particles 16, and the solvent is sequentially absorbed in the voids of porous particles 16F and fixing particles 16E, and the pigment (coloring material) is trapped on the surface of primary particles (porous particles 16F, fixing particles 16E) forming the ink receptive particles 16.

In this case, preferably, it is desired to trap a plural pigments near the surface of particle layer 16A of ink receptive particles 16. This is realized when voids between the primary particles composing secondary particles have filter effects to trap the pigment near the surface of particle layer 16A, and also trap and fix on the surface of primary particles.

To trap the pigment securely near the surface of particle layer 16A and on the surface of primary particles, the ink may react with ink receptive particles 16, and hence, the pigment may be quickly made insoluble (aggregated). Specifically, this reaction may be realized by making use of reaction between ink and polyhydric metal salt, or pH reaction type.

A line-type ink jet recording head having width equal or larger to width of the recording medium is desirable, and yet an image may sequentially be formed on a particle layer formed on the intermediate transfer body by using a conventional scan-type ink jet recording head. An ink discharge means of the ink jet recording head 20 is not limited if it is a means capable of discharging ink, such as piezoelectric element driving type and heater element driving type. Ink using conventional dyestuffs as a coloring material can be used for ink itself, and yet pigment ink is desirable.

In the case of reacting the ink receptive particles 16 with ink, the treatment is performed in aqueous solution containing an aggregating agent (such as multivalent metal salt and organic acid) providing the effect of reacting the ink receptive particles 16 with ink to aggregate pigment, and the dried solution is used.

<Transfer Process>

The ink receptive particle layer 16A in which an image is formed by receiving ink drops 20A is transferred and fixed on a recording medium 8, and therefore, an image is formed on the recording medium 8. The transfer and fixing may be done in separate processes. However the transfer and fixing is preferably done at the same time. The fixing may be effected by any one of heating or pressing methods of the particle layer 16A, or by using both method of heating and pressing methods, or preferably by heating and pressing at the same time.

By controlling heating/pressing, the surface properties of ink receptive particle layer 16A can be controlled, and the degree of gloss can be controlled. After heating/pressing, when peeling the recording medium 8 on which an image (the ink receptive particle layer 16A) is transferred from the intermediate transfer body 12, it may be peeled off after cooling of the ink receptive particle layer 16A. Examples of the cooling method include natural cooling and forced cooling such as air-cooling. In these processes, the intermediate transfer body 12 is preferred to be of belt shape.

The ink image is formed on the surface layer of ink receptive particles 16 formed on the intermediate transfer body 12

(the pigment is trapped near the surface of ink receptive particle layer 16A), and transferred on the recording medium 8, and therefore the ink image is formed so as to be protected by the particle layer 16C composed of ink receptive particles 16.

An ink liquid component (solvent and dispersion medium) received/retained by the ink receptive particle 16 layer is retained in the ink receptive particle 16 layer also after being transferred and fixed, and removed by natural seasoning.

<Releasing Layer>

To enhance the transfer efficiency, before supplying of ink receptive particles 16, a process may be provided for forming a releasing layer 14A such as silicone oil or the like on the surface of intermediate transfer body 12. Examples of the material for the releasing layer include silicone oil, modified silicone oil, fluorine based oil, hydrocarbon based oil, mineral oil, vegetable oil, polyalkylene glycol oil, alkyl glycol ether, alkane diol, fused wax, or the like.

Examples of supply method of releasing layer 14 include a method including supplying oil into an oil application member from a built-in oil tank, and forming the releasing layer 14A by supplying oil on the surface of intermediate transfer body 12 by the application member, and a method including forming a releasing layer 14A on the surface of intermediate transfer body 12 by application member impregnated with oil.

<Cleaning Process>

To allow repetitive use by refreshing the surface of intermediate transfer body 12, a process of cleaning the surface by a cleaning device 24 is needed. The cleaning device 24 includes a cleaning part and a recovery part for conveying particles (not shown), and by the cleaning process, the ink receptive particles 16 (residual particles 16D) remaining on the surface of intermediate transfer body 12, and deposits sticking to the surface of intermediate transfer body 12 such as foreign matter (paper dust of recording medium 8 and others) other than particles can be removed. The collected residual particles 16D may be recycled.

<Neutralization Process>

Before forming the releasing layer 14A, using the neutralizer 29, the surface of the intermediate transfer body 12 may be neutralized.

Other Exemplary Embodiments

In exemplary embodiments, ink droplets 20A are selectively ejected from the ink jet recording heads 20 in black, yellow, magenta, and cyan colors on the basis of image data, and a full-color image is recorded on the recording medium 8. However the invention is not limited to the recording of characters or images on a recording medium. That is, the liquid droplet ejection apparatus used in the invention can be applied generally in liquid droplet ejection (jetting) apparatuses used industrially.

EXAMPLES I

The exemplary embodiments of the invention are hereinafter described more specifically by referring to examples. Each of these examples, however, does not limit the exemplary embodiments.

—Preparation of Particles A—
Styrene: 45 parts by weight
Butyl acrylate: 50 parts by weight
Acrylic acid: 3 parts by weight
Dodecyl mercaptan: 1 part by weight
Calcium carbonate (NEOLIGHT GP-20, manufactured by Takehara Chemical Industrial Co., Ltd., an average spherical equivalent diameter of 0.03 µm): 2 parts by weight The above components are mixed, stirred and thereafter subjected to an ultrasonic disperser to prepare dispersion A. On the other hand, 1.5 parts by weight of abietic acid is added to sodium hydroxide aqueous solution adjusted to a pH of 12, and warmed up to a temperature of 70° C. to prepare solution B. The solution A is dropped into the solution B to prepare dispersion. Ammonium persulfate aqueous solution is projected into this dispersion to thereafter nitrogen-substitute the atmosphere and continue heating and stirring. This reaction solution is cooled to room temperature (25° C.) to obtain resin particle dispersion. Subsequently, these resin particles are dried in a freeze dryer to obtain particles a1. The hydrophilic monomer ratio in these particles is 4.8 mol % and the average spherical equivalent diameter is 0.06 µm.

Styrene/n-butyl methacrylate/methacrylic acid copolymer particles (host particles: a hydrophilic monomer ratio of 36 mol % and an average spherical equivalent diameter of 8 µm): 100 parts by weight The above-mentioned particles a1 (externally added particles): 0.8 part by weight Amorphous silica (externally added particles: Aerosil TT600, manufactured by Degussa, an average spherical equivalent diameter of 0.04 µm): 2 parts by weight The above components are mixed and stirred to prepare particles A having an average spherical equivalent diameter of 10 µm.

—Preparation of Particles B—
Styrene: 20 parts by weight
Ethyl acrylate: 75 parts by weight
Methacrylic acid: 2 parts by weight
Dodecyl mercaptan: 1 part by weight
Calcium carbonate (NEOLIGHT GP-20, manufactured by Takehara Chemical Industrial Co., Ltd., an average spherical equivalent diameter of 0.03 µm): 2 parts by weight The above components are mixed, stirred and thereafter subjected to an ultrasonic disperser to prepare dispersion A. On the other hand, 1.5 parts by weight of abietic acid is added to sodium hydroxide aqueous solution adjusted to a pH of 12, and warmed up to a temperature of 70° C. to prepare solution B. The solution A is dropped into the solution B to prepare dispersion. Ammonium persulfate aqueous solution is projected into this dispersion to thereafter nitrogen-substitute the atmosphere and continue heating and stirring. This reaction solution is cooled to room temperature (25° C.) to obtain resin particle dispersion. Subsequently, these resin particles are dried in a freeze dryer to obtain particles b1. The hydrophilic monomer ratio in these particles is 2.4 mol % and the average spherical equivalent diameter is 0.14 µm.

Styrene/2-ethylhexyl methacrylate/acrylic acid copolymer particles (host particles: a hydrophilic monomer ratio of 57 mol % and an average spherical equivalent diameter of 6 µm): 100 parts by weight The above-mentioned particles b1 (externally added particles): 0.6 part by weight Calcium carbonate (externally added particles: NEOLIGHT GP-20, manufactured by Takehara Chemical Industrial Co., Ltd., an average spherical equivalent diameter of 0.03 µm): 1 part by weight The above components are mixed and stirred to prepare particles B having an average spherical equivalent diameter of 8 µm.

—Particles C—
Styrene: 30 parts by weight
Ethyl acrylate: 65 parts by weight

Methacrylic acid: 3 parts by weight
Dodecyl mercaptan: 1 part by weight
Calcium carbonate (NEOLIGHT GP-20, manufactured by Takehara Chemical Industrial Co., Ltd., an average spherical equivalent diameter of 0.03 μm): 2 parts by weight The above components are mixed, stirred and thereafter subjected to an ultrasonic disperser to prepare dispersion A. On the other hand, 1.5 parts by weight of abietic acid is added to sodium hydroxide aqueous solution adjusted to a pH of 12, and warmed up to a temperature of 70° C. to prepare solution B. The solution A is dropped into the solution B to prepare dispersion. Ammonium persulfate aqueous solution is projected into this dispersion to thereafter nitrogen-substitute the atmosphere and continue heating and stirring. This reaction solution is cooled to room temperature (25° C.) to obtain resin particle dispersion. Subsequently, these resin particles are dried in a freeze dryer to obtain particles c1. The hydrophilic monomer ratio in these particles is 3.6 mol % and the average spherical equivalent diameter is 0.04 μm.

Styrene/n-butyl methacrylate/methacrylic acid copolymer particles (host particles: a hydrophilic monomer ratio of 41 mol % and an average spherical equivalent diameter of 7 μm): 100 parts by weight The above-mentioned particles c1 (externally added particles): 1.8 parts by weight Amorphous silica (externally added particles: Aerosil A-130, manufactured by Degussa, an average spherical equivalent diameter of 0.016 μm): 1 part by weight The above components are mixed and stirred to prepare particles C having an average spherical equivalent diameter of 9 μm.

—Particles D—
Styrene: 70 parts by weight
Butyl acrylate: 25 parts by weight
Acrylic acid: 5 parts by weight
Dodecyl mercaptan: 1 part by weight The above components are mixed and dispersed to prepare dispersion A. On the other hand, 1.5 parts by weight of abietic acid is added to sodium hydroxide aqueous solution adjusted to a pH of 12, and warmed up to a temperature of 70° C. to prepare solution B. The solution A is dropped into the solution B to prepare dispersion. Ammonium persulfate aqueous solution is projected into this dispersion to thereafter nitrogen-substitute the atmosphere and continue heating and stirring. This reaction solution is cooled to room temperature (25° C.) to obtain resin particle dispersion. Subsequently, this resin particle dispersion is dried in a freeze dryer to obtain particles d1. The hydrophilic monomer ratio in these particles is 7.4 mol % and the average spherical equivalent diameter is 0.08 μm.

10 parts by weight of the particles is further added to toluene, and the solution is stirred and dispersed by an ultrasonic disperser. 1.5 parts by weight of γ-aminopropyltriethoxysilane is added to this dispersion and stirred at room temperature (25° C.). Subsequently, toluene is distilled off to dry the particles, which is further heated to a temperature of 110° C. to obtain particles d1 with aminosilane treatment performed.

Styrene/n-butyl methacrylate/methacrylic acid copolymer particles (host particles: a hydrophilic monomer ratio of 19 mol % and an average spherical equivalent diameter of 4 μm): 50 parts by weight Styrene/n-butyl methacrylate/methacrylic acid copolymer particles (host particles: a hydrophilic monomer ratio of 86 mol % and an average spherical equivalent diameter of 5 μm): 50 parts by weight The above-mentioned particles d1 (externally added particles): 1 part by weight Calcium carbonate (externally added particles: NEOLIGHT GP-20, manufactured by Takehara Chemical Industrial Co., Ltd., an average spherical equivalent diameter of 0.03 μm): 1 part by weight The above components are mixed and stirred to prepare particles D having an average spherical equivalent diameter of 7 μm.

—Particles E—
Ethyl acrylate: 50 parts by weight
Butyl acrylate: 40 parts by weight
Methacrylic acid: 7 parts by weight
Dodecyl mercaptan: 1 part by weight The above components are mixed and dissolved to prepare solution A. On the other hand, 1.5 parts by weight of abietic acid is added to sodium hydroxide aqueous solution adjusted to a pH of 12, and warmed up to a temperature of 70° C. to prepare solution B. The solution A is dropped into the solution B to prepare dispersion. Ammonium persulfate aqueous solution is projected into this dispersion to thereafter nitrogen-substitute the atmosphere and continue heating and stirring. This reaction solution is cooled to room temperature (25° C.) to obtain resin particle dispersion. Subsequently, this resin particle dispersion is dried in a freeze dryer to obtain particles e1. The hydrophilic monomer ratio in these particles is 9.3 mol % and the average spherical equivalent diameter is 0.18 μm.

Styrene/2-ethylhexyl methacrylate/maleic acid copolymer particles (particles composing host particles: a hydrophilic monomer ratio of 16 mol % and an average spherical equivalent diameter of 8 μm): 100 parts by weight Amorphous silica (particles composing host particles: Aerosil OX50, manufactured by Degussa, an average spherical equivalent diameter of 0.04 μm): 5 parts by weight Amorphous silica (particles composing host particles: Aerosil TT600, manufactured by Degussa, an average spherical equivalent diameter of 0.041 μm): 5 parts by weight Polypropylene wax (PELESTAT 300, manufactured by Sanyo Chemical Industries, Ltd.): 1 part by weight The above components are mixed and stirred (for 30 seconds by a sample mill), and thereafter a small amount of sodium hydroxide aqueous solution is added thereto and intermittently treated for composite particles in a mechanofusion system. The particle diameter is measured on each intermittent drive condition to take out at the step of 9 μm and obtain particles e2 (an average spherical equivalent diameter of 9 μm and a void size (the largest bore) of 0.75 μm).

The above-mentioned particles e1 (host particles): 1.5 parts by weight

The above-mentioned particles e2 (externally added particles): 100 parts by weight The above components are mixed and stirred to prepare particles E having an average spherical equivalent diameter of 10 μm.

—Particles F—
Styrene: 70 parts by weight
Butyl acrylate: 25 parts by weight
Acrylic acid: 5 parts by weight
Dodecyl mercaptan: 1 part by weight The above components are mixed and dispersed to prepare dispersion A. On the other hand, 1.5 parts by weight of abietic acid is added to sodium hydroxide aqueous solution adjusted to a pH of 12, and warmed up to a temperature of 70° C. to prepare solution B. The solution A is dropped into the solution B to prepare dispersion. Ammonium persulfate aqueous solution is projected into this dispersion to thereafter nitrogen-substitute the atmosphere and continue heating and stirring. This reaction solution is cooled to room temperature (25° C.) to obtain resin particle dispersion. Subsequently, this resin particle dispersion is dried in a freeze dryer to obtain particles f1. The hydrophilic monomer ratio in these particles is 7.3 mol % and the average spherical equivalent diameter is 0.08 μm.

Styrene/n-butyl methacrylate/methacrylic acid copolymer particles (host particles: a hydrophilic monomer ratio of 22 mol % and an average spherical equivalent diameter of 7 μm): 80 parts by weight The above-mentioned particles f1 (externally added particles): 20 parts by weight Amorphous silica (externally added particles: Aerosil TT600, manufactured by Degussa, an average spherical equivalent diameter of 0.04 μm): 5 parts by weight The above components are mixed and stirred to prepare particles F having an average spherical equivalent diameter of 9 μm.

—Particles G—
Styrene: 70 parts by weight
Butyl acrylate: 25 parts by weight
Acrylic acid: 5 parts by weight
Dodecyl mercaptan: 1 part by weight The above components are mixed and dispersed to prepare dispersion A. On the other hand, 1.5 parts by weight of abietic acid is added to sodium hydroxide aqueous solution adjusted to a pH of 12, and warmed up to a temperature of 70° C. to prepare solution B. The solution A is dropped into the solution B to prepare dispersion. Ammonium persulfate aqueous solution is projected into this dispersion to thereafter nitrogen-substitute the atmosphere and continue heating and stirring. This reaction solution is cooled to room temperature (25° C.) to obtain resin particle dispersion. Subsequently, this resin particle dispersion is dried in a freeze dryer to obtain particles g1. The hydrophilic monomer ratio in these particles is 7.3 mol % and the average spherical equivalent diameter is 0.02 μm.

Styrene/n-butyl methacrylate/methacrylic acid copolymer particles (host particles: a hydrophilic monomer ratio of 22 mol % and an average spherical equivalent diameter of 6 μm): 85 parts by weight The above-mentioned particles g1 (externally added particles): 15 parts by weight Amorphous silica (externally added particles: Aerosil TT600, manufactured by Degussa, an average spherical equivalent diameter of 0.04 μm): 5 parts by weight The above components are mixed and stirred to prepare particles G having an average spherical equivalent diameter of 9 μm.

—Particles H—
Dimethyl terephthalate: 35 parts by weight
Dimethyl isophthalate sodium 5-sulfonate: 8 parts by weight
Propylene glycol: 20 parts by weight
Diethylene glycol: 20 parts by weight
Dipropylene glycol: 10 parts by weight
dibutyltin oxide: 0.015 part by weight The above components are warmed up under the nitrogen atmosphere and thereafter subjected to condensation reaction to obtain polyester resin. 180 parts by weight of ion-exchange water is added to 20 parts by weight of the polyester resin, warmed up and thereafter adjusted to a pH of 9, which polyester resin is further stirred while adding dodecylbenzenesulfonic acid aqueous solution to prepare polyester resin latex. Subsequently, this resin particle dispersion is dried in a freeze dryer to obtain polyester particles h1. The hydrophilic monomer ratio of these particles h1 is 7 mol % and the average spherical equivalent diameter is 0.018 μm.

Styrene/n-butyl methacrylate/methacrylic acid copolymer particles (host particles: a hydrophilic monomer ratio of 22 mol % and an average spherical equivalent diameter of 7 μm): 100 parts by weight The above-mentioned particles h1 (externally added particles): 2.5 parts by weight Amorphous silica (externally added particles: Aerosil TT600, manufactured by Degussa, an average spherical equivalent diameter of 0.04 μm): 5 parts by weight The above components are mixed and stirred to prepare particles H having an average spherical equivalent diameter of 9 μm.

—Particles I—
Styrene: 70 parts by weight
Butyl acrylate: 25 parts by weight
Acrylic acid: 4.5 parts by weight
Styrenesulfonic acid: 0.5 part by weight
Dodecyl mercaptan: 1 part by weight The above components are mixed and dispersed to prepare dispersion A. On the other hand, 1.5 parts by weight of abietic acid is added to sodium hydroxide aqueous solution adjusted to a pH of 12, and warmed up to a temperature of 70° C. to prepare solution B. The solution A is dropped into the solution B to prepare dispersion. Ammonium persulfate aqueous solution is projected into this dispersion to thereafter nitrogen-substitute the atmosphere and continue heating and stirring. This reaction solution is cooled to room temperature (25° C.) to obtain resin particle dispersion. Subsequently, this resin particle dispersion is dried in a freeze dryer to obtain particles i1. The hydrophilic monomer ratio in these particles is 6.9 mol % and the average spherical equivalent diameter is 0.03 μm.

Styrene/n-butyl methacrylate/methacrylic acid copolymer particles (host particles: a hydrophilic monomer ratio of 22 mol % and an average spherical equivalent diameter of 6 μm): 95 parts by weight The above-mentioned particles i1 (externally added particles): 5 parts by weight Amorphous silica (externally added particles: Aerosil TT600, manufactured by Degussa, an average spherical equivalent diameter of 0.04 μm): 2 parts by weight The above components are mixed and stirred to prepare particles I having an average spherical equivalent diameter of 9 μm.

—Particles J—
Styrene: 70 parts by weight
Butyl acrylate: 25 parts by weight
Acrylic acid: 4.5 parts by weight
4-hydroxybutyl acrylate: 0.5 part by weight
Dodecyl mercaptan: 1 part by weight The above components are mixed and dissolved to prepare solution A. On the other hand, 1.5 parts by weight of abietic acid is added to sodium hydroxide aqueous solution adjusted to a pH of 12, and warmed up to a temperature of 70° C. to prepare solution B. The solution A is dropped into the solution B to prepare dispersion. Ammonium persulfate aqueous solution is projected into this dispersion to thereafter nitrogen-substitute the atmosphere and continue heating and stirring. This reaction solution is cooled to room temperature (25° C.) to obtain resin particle dispersion. Subsequently, these resin particles A are dried in a freeze dryer to obtain particles j1. The hydrophilic monomer ratio in these particles is 7.0 mol % and the number-average particle diameter is 0.04 μm.

Styrene/n-butyl methacrylate/methacrylic acid copolymer particles (host particles: a hydrophilic monomer ratio of 22 mol % and an average spherical equivalent diameter of 7 µm): 100 parts by weight The above-mentioned particles j1 (externally added particles): 2.5 parts by weight Amorphous silica (externally added particles: Aerosil TT600, manufactured by Degussa, an average spherical equivalent diameter of 0.04 µm): 1 part by weight The above components are mixed and stirred to prepare particles J having an average spherical equivalent diameter of 9 µm.

—Particles K—
Styrene: 70 parts by weight
Butyl acrylate: 25 parts by weight
Acrylic acid: 4.5 parts by weight
Vinylpyrrolidone: 0.5 part by weight
Dodecyl mercaptan: 1 part by weight The above components are mixed and dissolved to prepare solution A. On the other hand, 1.5 parts by weight of abietic acid is added to sodium hydroxide aqueous solution adjusted to a pH of 12, and warmed up to a temperature of 70° C. to prepare solution B. The solution A is dropped into the solution B to prepare dispersion. Ammonium persulfate aqueous solution is projected into this dispersion to thereafter nitrogen-substitute the atmosphere and continue heating and stirring. This reaction solution is cooled to room temperature (25° C.) to obtain resin particle dispersion. Subsequently, these resin particles A are dried in a freeze dryer to obtain particles k1. The hydrophilic monomer ratio in these particles is 7.1 mol % and the number-average particle diameter is 0.025 µm.

Styrene/n-butyl methacrylate/methacrylic acid copolymer particles (host particles: a hydrophilic monomer ratio of 22 mol % and an average spherical equivalent diameter of 6 µm): 100 parts by weight The above-mentioned particles k1 (externally added particles): 2.5 parts by weight Amorphous silica (externally added particles: Aerosil TT600, manufactured by Degussa, an average spherical equivalent diameter of 0.04 µm): 1 part by weight The above components are mixed and stirred to prepare particles K having an average spherical equivalent diameter of 9 µm.

—Particles L—
Styrene: 50 parts by weight
Butyl acrylate: 32 parts by weight
Acrylic acid: 18 parts by weight
Dodecyl mercaptan: 1 part by weight The above components are mixed and dissolved to prepare solution A. On the other hand, 1.5 parts by weight of abietic acid is added to sodium hydroxide aqueous solution adjusted to a pH of 12, and warmed up to a temperature of 70° C. to prepare solution B. The solution A is dropped into the solution B to prepare dispersion. Ammonium persulfate aqueous solution is projected into this dispersion to thereafter nitrogen-substitute the atmosphere and continue heating and stirring. This reaction solution is cooled to room temperature (25° C.) to obtain resin particle dispersion. Subsequently, these resin particles are dried in a freeze dryer to obtain particles l1. The hydrophilic monomer ratio in these particles is 25.3 mol % and the average spherical equivalent diameter is 0.35 µm.

Styrene/n-butyl methacrylate/acrylic acid copolymer particles (host particles: a hydrophilic monomer ratio of 22 mol % and an average spherical equivalent diameter of 7 µm): 100 parts by weight The above-mentioned particles l1 (externally added particles): 10 parts by weight Calcium carbonate (externally added particles: NEOLIGHT GP-20, manufactured by Takehara Chemical Industrial Co., Ltd., an average spherical equivalent diameter of 0.03 µm): 5 parts by weight The above components are mixed and stirred to prepare particles L having an average spherical equivalent diameter of 9 µm.

—Particles M—
Styrene: 20 parts by weight
Ethyl acrylate: 75 parts by weight
Methacrylic acid: 2 parts by weight
Dodecyl mercaptan: 1 part by weight Calcium carbonate (NEOLIGHT GP-20, manufactured by Takehara Chemical Industrial Co., Ltd., an average spherical equivalent diameter of 0.03 µm): 2 parts by weight The above components are mixed, stirred and thereafter subjected to an ultrasonic disperser to prepare dispersion A. On the other hand, 1.5 parts by weight of abietic acid is added to sodium hydroxide aqueous solution adjusted to a pH of 12, and warmed up to a temperature of 70° C. to prepare solution B. The solution A is dropped into the solution B to prepare dispersion. Ammonium persulfate aqueous solution is projected into this dispersion to thereafter nitrogen-substitute the atmosphere and continue heating and stirring. This reaction solution is cooled to room temperature (25° C.) to obtain resin particle dispersion. Subsequently, these resin particles are dried in a freeze dryer to obtain particles m1. The hydrophilic monomer ratio in these particles is 2.9 mol % and the average spherical equivalent diameter is 0.14 µm.

Styrene/n-butyl methacrylate/acrylic acid copolymer particles (host particles: a hydrophilic monomer ratio of 92 mol % and an average spherical equivalent diameter of 6 µm): 100 parts by weight The above-mentioned particles m1 (externally added particles): 0.2 part by weight Calcium carbonate (externally added particles: NEOLIGHT GP-20, manufactured by Takehara Chemical Industrial Co., Ltd., an average spherical equivalent diameter of 0.03 µm): 1 part by weight The above components are mixed and stirred to prepare particles M having an average spherical equivalent diameter of 9 µm.

—Particles N—
Styrene: 30 parts by weight
Ethyl acrylate: 65 parts by weight
Methacrylic acid: 3 parts by weight A copolymer having the above-mentioned composition is pulverized by using a jet mill. This is subjected to an air classifier to remove coarse particles and obtain particles n1. The hydrophilic monomer ratio of these particles n1 is 3.6 mol % and the average spherical equivalent diameter is 1.21 µm.

Styrene/n-butyl methacrylate/acrylic acid copolymer particles (host particles: a hydrophilic monomer ratio of 8.5 mol % and an average spherical equivalent diameter of 7 µm): 100 parts by weight The above-mentioned particles n1 (externally added particles): 7.5 parts by weight Amorphous silica (externally added particles: Aerosil A-130, manufactured by Degussa, an average spherical equivalent diameter of 0.016 µm): 1 part by weight The above components are mixed and stirred to prepare particles N having an average spherical equivalent diameter of 9 µm.

The characteristics of particles A to N prepared above are shown together in Table 1.

TABLE 1

|  | Host particles | | | Externally added particles (organic particles) | | |
|---|---|---|---|---|---|---|
|  | Particle form | Hydrophilic polymer particle Hydrophilic monomer ratio (mol %) | Hydrophilic polymer particle ratio (%) | Hydrophilic monomer ratio (mol %) | Average spherical equivalent diameter (μm) | Hydrophobic polymer particle ratio (mol %) |
| Particles A | Organic primary particles | 36 | 97.3 | 4.8 | 0.06 | 0.78 |
| Particles B | Organic primary particles | 57 | 98.4 | 2.4 | 0.14 | 0.59 |
| Particles C | Organic primary particles | 41 | 97.3 | 3.6 | 0.04 | 1.8 |
| Particles D | Organic primary particles (two kinds) | 19<br>86 | 98.0 | 7.4 | 0.08 | 1.0 |
| Particles E | Organic/inorganic composite particles | 16 | 98.5 | 9.3 | 0.18 | 1.5 |
| Particles F | Organic primary particles | 22 | 76.2 | 7.3 | 0.08 | 19.1 |
| Particles G | Organic primary particles | 22 | 81.0 | 7.3 | 0.02 | 14.3 |
| Particles H | Organic primary particles | 22 | 93.0 | 7 | 0.018 | 2.3 |
| Particles I | Organic primary particles | 22 | 93.1 | 6.9 | 0.03 | 4.9 |
| Particles J | Organic primary particles | 22 | 96.6 | 7.0 | 0.04 | 2.4 |
| Particles K | Organic primary particles | 22 | 96.6 | 7.1 | 0.025 | 2.4 |
| Particles L | Organic primary particles | 22 | 87.0 | 25.3 | 0.35 | 8.7 |
| Particles M | Organic primary particles | 92 | — | 2.9 | 0.14 | 0.2 |
| Particles N | Organic primary particles | 8.5 | — | 3.6 | 1.2 | 6.9 |

EXAMPLES I-1 to I-11 and COMPARATIVE EXAMPLES I-1 to I-3

Each of the above-mentioned particles is utilized as ink receptive particles to perform the following evaluations by using the following ink A. The results are shown in Table 2.

—Ink A—

The following ink components are mixed and stirred to thereafter prepare ink by filtering with the use of a membrane filter having a pore size of 5 μm.

—Ink Components—

Cyan pigment (C. I. Pig. Blue 15:3): 7.5 parts by weight
Styrene/acrylic acid (an acid value of 150 mg KOH/g): 2.5 parts by weight
Butyl carbitol: 2.5 parts by weight
Diethylene glycol: 10 parts by weight
Glycerol: 25 parts by weight
Nonionic surface active agent (acetylene glycol derivative): 1 part by weight
pH adjustor and bactericide (PROXEL GXL(S), manufactured by Arch Chemicals Japan): a small amount
Pure water: 60 parts by weight The obtained ink offers surface tension=33 mN/m, viscosity=7.2 mPa·s, pH=8.8 and volume-average particle diameter=92 nm.

—Image Disorder—

Image disorder is evaluated by forming an image in the following manner. The particles are sprayed on an intermediate medium by using a cake printer. At this time, the spray amount of the particles varies with kinds thereof and yet is in a range of 5 to 12 g/m². Ink of 2 pL is provided on this intermediate medium, on which the particles are sprayed, with an image area ratio of 1200×1200 dpi by using a piezo-type ink jet device to form a line image. OK Golden Cask (manufactured by Oji Paper Co., Ltd.) is welded with a pressure of $3 \times 10^5$ Pa to the image obtained in this manner to heat a recoding medium at a temperature of 90° C. for 1 minute. The image obtained in this manner is made into a magnified image by visual observation and using a microscope to determine image disorder.

The evaluation criterion is as follows.

A: no image disorder is caused in a magnified image

B: image disorder is caused in a magnified image and yet incapable of being distinguished by visual observation, which is in a permissible range B⁻: image disorder is caused in a magnified image and capable of being partially distinguished by visual observation, which is yet in a permissible range C: image disorder is capable of being entirely distinguished by visual observation, which is yet in a permissible range E: image disorder is capable of being distinguished by visual observation, which is out of a permissible range —Image After a Long-term Storage—

An image after a long-term storage is evaluated in the same manner as the evaluation method of image disorder by using ink receptive particles stored for 1 month under such an environment as a temperature of 28° C. and a humidity of 85 RH %.

The evaluation criterion is as follows.

A: no image disorder is caused in a magnified image

B: image disorder is caused in a magnified image and yet incapable of being distinguished by visual observation, which is in a permissible range B⁻: image disorder is caused in a magnified image and capable of being partially distinguished by visual observation, which is yet in a permissible range C: image disorder is capable of being entirely distinguished by visual observation, which is yet in a permissible range E: image disorder is capable of being distinguished by visual observation, which is out of a permissible range —Drying Time—

Drying time is evaluated by forming an image in the following manner. The particles are sprayed on an intermediate medium by using a cake printer. At this time, the spray amount of the particles varies with kinds thereof and yet is in a range of 5 to 12 g/m². Ink is provided with 4.5 g/m² on this intermediate medium, on which the particles are sprayed, by using a piezo-type ink jet device to form a solid image. A roller is pushed against the formed image portion with a load of $2 \times 10^4$ Pa to regard as drying time the time until the ink is not transferred to the side of the roller paper.

The evaluation criterion is as follows.

A: drying time of less than 0.3 second

B: drying time of 0.3 second or more and less than 0.5 second

B⁻: drying time of 0.5 second or more and less than 1 second

C: drying time of 1 second or more and less than 3 seconds

D: drying time of 3 seconds or more

TABLE 2

| | Ink receptive particle kind | Image disorder | Image after a long-term storage | Drying time |
|---|---|---|---|---|
| Example I-1 | A | A | A | A |
| Example I-2 | B | A | A | A |
| Example I-3 | C | A | A | A |
| Example I-4 | D | B | B | A |
| Example I-5 | E | B | B | B |
| Example I-6 | F | C | B⁻ | C |
| Example I-7 | G | C | B⁻ | B⁻ |
| Example I-8 | H | B⁻ | B | B |
| Example I-9 | I | B⁻ | B | B |
| Example I-10 | J | B | B | B |
| Example I-11 | K | B | B | B |
| Comparative example I-1 | L | C | D | D |
| Comparative example I-2 | M | D | D | B |
| Comparative example I-3 | N | D | C | D |

As understood from Table 2, as compared with comparative examples, it is found in the examples that electrification characteristic decrease is restrained and an image can be formed with no image disorder. Also, as compared with comparative examples, it is found in the examples that recording can be performed at high speed for diverse recording media even in the case of utilizing various inks.

EXAMPLES II

The another exemplary embodiments are hereinafter described more specifically by referring to examples. Each of these examples, however, does not limit the exemplary embodiments.

—Preparation of Particles A—

Styrene/n-butyl methacrylate/acrylic acid copolymer (a hydrophilic monomer ratio of 50 mol %): 95 parts by weight Amorphous polyester resin (a hydrophilic monomer ratio of 1 mol %): 5 parts by weight Paraffin wax (OX-3215, manufactured by NIPPON SEIRO CO., LTD.): 1 part by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier to obtain particles (host particles) having an average spherical equivalent diameter of 8 μm.

Subsequently, with 100 parts by weight of particles (host particles) obtained in this manner Calcium carbonate (externally added particles: NEO-LIGHT GP-20, manufactured by Takehara Chemical Industrial Co., Ltd., an average spherical equivalent diameter of 0.03 μm): 1 part by weight is mixed and stirred to prepare particles having an average spherical equivalent diameter of 10 μm, which are regarded as particles A.

—Preparation of Particles B—

Styrene/2-ethylhexyl methacrylate/acrylic acid copolymer (a hydrophilic monomer ratio of 45 mol %): 85 parts by weight Styrene/n-butyl methacrylate/acrylic acid copolymer (a hydrophilic monomer ratio of 5 mol %): 15 parts by weight Polypropylene wax (PELESTAT 300, manufactured by Sanyo Chemical Industries, Ltd.): 1 part by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier to obtain particles (host particles) having an average spherical equivalent diameter of 10 μm.

Subsequently, with 100 parts by weight of particles (host particles) obtained in this manner Amorphous silica (externally added particles: Aerosil TT600, manufactured by Degussa, an average spherical equivalent diameter of 0.04 μm): 1 part by weight is mixed and stirred to prepare particles having an average spherical equivalent diameter of 12 μm, which are regarded as particles B.

—Preparation of Particles C—

Styrene/n-butyl methacrylate/methacrylic acid copolymer (a hydrophilic monomer ratio of 60 mol %): 75 parts by weight Styrene/n-butyl methacrylate/acrylic acid copolymer (a hydrophilic monomer ratio of 5 mol %): 15 parts by weight Amorphous polyester resin (a hydrophilic monomer ratio of 1.5 mol %): 10 parts by weight The above-mentioned materials are mixed, stirred by a Henschel mixer and regarded as a kneading material. Subsequently, the kneading material is projected into an extruder and melt-kneaded. The obtained kneaded product is cooled and thereafter coarsely pulverized by using a hammer mill. Subsequently, the product is pulverized by using a jet mill. This is subjected to an air classifier to obtain particles (host particles) having an average spherical equivalent diameter of 9 μm.

Subsequently, with 100 parts by weight of particles (host particles) obtained in this manner Amorphous silica (externally added particles: Aerosil A130, manufactured by Degussa, an average spherical equivalent diameter of 0.016 μm): 1 part by weight is mixed and stirred to prepare particles having an average spherical equivalent diameter of 10 μm, which are regarded as particles C.

—Preparation of Particles D—

Amorphous polyester resin (a hydrophilic monomer ratio of 1 mol %): 98 parts by weight BONTRON E-84 (a charge control agent, manufactured by Orient Chemical Industries, LTD.): 2 parts by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier and classified.

Styrene/n-butyl methacrylate/acrylic acid copolymer (a hydrophilic monomer ratio of 50 mol %): 100 parts by weight The above-mentioned pulverized product: 20 parts by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier to obtain particles (host particles) having an average spherical equivalent diameter of 8 μm.

Subsequently, with 100 parts by weight of particles (host particles) obtained in this manner Calcium carbonate (externally added particles: NEOLIGHT GP-20, manufactured by Takehara Chemical Industrial Co., Ltd., an average spherical equivalent diameter of 0.03 μm): 1 part by weight is mixed and stirred to prepare particles having an average spherical equivalent diameter of 10 μm, which are regarded as particles D.

—Preparation of Particles E—

Amorphous polyester resin (a hydrophilic monomer ratio of 0.75 mol %): 94 parts by weight LR-147 (a charge control agent, manufactured by Japan Carlit Co., Ltd.): 6 parts by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier and classified.

Styrene/n-butyl methacrylate/acrylic acid copolymer (a hydrophilic monomer ratio of 75 mol %): 100 parts by weight The above-mentioned pulverized product: 80 parts by weight Paraffin wax (OX-3215, manufactured by NIPPON SEIRO CO., LTD.): 1 part by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier to obtain particles (host particles) having an average spherical equivalent diameter of 9 μm.

Subsequently, with 100 parts by weight of particles (host particles) obtained in this manner Amorphous silica (externally added particles: Aerosil TT600, manufactured by Degussa, an average spherical equivalent diameter of 0.04 μm): 1 part by weight is mixed and stirred to prepare particles having an average spherical equivalent diameter of 11 μm, which are regarded as particles E.

—Preparation of Particles F—

Styrene/n-butyl methacrylate/acrylic acid/vinyl sulfonic acid copolymer (a hydrophilic monomer ratio of 5 mol %): 95 parts by weight TN-105 (a charge control agent, manufactured by HODOGAYA CHEMICAL CO., LTD.): 5 parts by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier and classified.

Styrene/n-butyl methacrylate/acrylic acid copolymer (a hydrophilic monomer ratio of 65 mol %): 100 parts by weight The above-mentioned pulverized product: 25 parts by weight Polypropylene wax (PELESTAT 300, manufactured by Sanyo Chemical Industries, Ltd.): 1 part by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier to obtain particles (host particles) having an average spherical equivalent diameter of 8 μm.

Subsequently, with 100 parts by weight of particles (host particles) obtained in this manner Amorphous silica (externally added particles: Aerosil A130, manufactured by Degussa, an average spherical equivalent diameter of 0.016 μm): 1 part by weight is mixed and stirred to prepare particles having an average spherical equivalent diameter of 10 μm, which are regarded as particles F.

—Preparation of Particles G—

Styrene/N-(2-hydroxypropyl)methacrylamide/4-vinylpyridine copolymer (a hydrophilic monomer ratio of 2.5 mol %): 99 parts by weight Tin oxide (a charge control agent: SN-100P, manufactured by ISHIHARA SANGYO KAISHA, LTD.): 1 part by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier and classified.

Styrene/N,N-dimethylmethacrylamide/4-vinylpyridine copolymer (a hydrophilic monomer ratio of 70 mol %): 100 parts by weight The above-mentioned pulverized product: 40 parts by weight Polyvinyl alcohol: 1 part by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier to obtain particles (host particles) having an average spherical equivalent diameter of 8 μm.

Subsequently, with 100 parts by weight of particles (host particles) obtained in this manner Amorphous silica (externally added particles: Aerosil A-130, manufactured by Degussa, an average spherical equivalent diameter of 0.016 μm): 1 part by weight is mixed and stirred to prepare particles having an average spherical equivalent diameter of 9 μm, which are regarded as particles G.

—Preparation of Particles H—

Styrene/2-ethylhexyl methacrylate/maleic acid copolymer (a hydrophilic monomer ratio of 4.5 mol %): 95 parts by weight Magnesium benzoate (a charge control agent): 5 parts by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier to remove coarse particles and obtain particles having an average spherical equivalent diameter of 0.8 μm.

Styrene/n-butyl methacrylate/acrylic acid copolymer particles (a hydrophilic monomer ratio of 12.5 mol % and an average spherical equivalent diameter of 1.5 μm): 100 parts by weight The above-mentioned particles: 15 parts by weight Polyvinyl alcohol: 1 part by weight The above materials are mixed and stirred (for 30 seconds by a sample mill), and thereafter a very small amount of sodium hydroxide aqueous solution is added thereto and intermittently treated for composite particles in a mechanofusion system. The particle diameter is measured on each intermittent drive condition to take out at the step of an average spherical equivalent diameter of 5 μm and obtain particles (host particles).

Subsequently, with 100 parts by weight of particles (host particles) obtained in this manner Amorphous silica (externally added particles: Aerosil TT600, manufactured by Degussa, an average spherical equivalent diameter of 0.04 μm): 1 part by weight is mixed and stirred to prepare particles having an average spherical equivalent diameter of 7 μm, which are regarded as particles H.

—Preparation of Particles I—

Styrene/n-butyl methacrylate/acrylic acid copolymer (a hydrophilic monomer ratio of 1.8 mol %): 99.4 parts by weight LR-147 (a charge control agent, manufactured by Japan Carlit Co., Ltd.): 0.6 part by weight Particles are obtained by using the above materials. First, the above-mentioned styrene/n-butyl methacrylate/acrylic acid copolymer is added to ion-exchange water and subjected to a homogenizer while using a very small amount (5 parts by weight with respect to styrene/n-butyl methacrylate/acrylic acid copolymer) of an anionic surface-active agent as a dispersing agent to obtain dispersion A.

On the other hand, the LR-147 is added to ion-exchange water and subjected to a homogenizer while using a very small amount (10 parts by weight with respect to LR-147) of an anionic surface-active agent as a dispersing agent to obtain dispersion B.

The dispersion A and the dispersion B are added so as to be in predetermined addition ratio to further add 0.5 part by weight of calcium chloride as an aggregating agent thereto. The pH of this solution is adjusted to acidity, stirred and thereafter dispersed by a homogenizer. In addition, stirring is continued in a state of warming up for 3 hours.

The obtained dispersion is cooled to room temperature (23° C.) and thereafter subjected to a freeze dryer to obtain particles i having an average spherical equivalent diameter of 0.5 μm. Subsequently, 5 parts by weight of these particles i is added to ion-exchange water and subjected to a homogenizer while using a very small amount of an anionic surface-active agent as a dispersing agent to obtain dispersion A'.

On the other hand, 100 parts by weight of styrene/n-butyl methacrylate/acrylic acid copolymer particles (a hydrophilic monomer ratio of 17.5 mol % and an average spherical equivalent diameter of 2 μm) is added to ion-exchange water and subjected to a homogenizer while heated to obtain dispersion B'.

The dispersion A' and the dispersion B' are added so as to be in predetermined addition ratio to further add 0.5 part by weight of calcium chloride as an aggregating agent thereto. The pH of this solution is adjusted to acidity, stirred and thereafter dispersed by a homogenizer. In addition, stirring is continued in a state of warming up for 3 hours.

The obtained dispersion is cooled to room temperature (25° C.) and thereafter spray-dried by a spray dryer to obtain particles.

Subsequently, with 100 parts by weight of particles (host particles) obtained in this manner Amorphous silica (externally added particles: Aerosil TT600, manufactured by Degussa, an average spherical equivalent diameter of 0.04 μm): 1 part by weight is mixed and stirred to prepare particles having an average spherical equivalent diameter of 9 μm, which are regarded as particles I.

—Preparation of Particles J—

Styrene/n-butyl methacrylate/acrylic acid copolymer (a hydrophilic monomer ratio of 50 mol %): 33 parts by weight TN-105 (a charge control agent, manufactured by HODOGAYA CHEMICAL CO., LTD.): 67 parts by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier and classified.

Styrene/n-butyl methacrylate/acrylic acid copolymer (a hydrophilic monomer ratio of 50 mol %): 100 parts by weight The above-mentioned pulverized product: 15 parts by weight Polyvinyl alcohol: 1 part by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier to obtain particles having an average spherical equivalent diameter of 9 μm.

Subsequently, with 100 parts by weight of particles (host particles) obtained in this manner Calcium carbonate (externally added particles: NEOLIGHT GP-20, manufactured by Takehara Chemical Industrial Co., Ltd., an average spherical equivalent diameter of 0.03 μm): 1 part by weight is mixed and stirred to prepare particles having an average spherical equivalent diameter of 9 μm.

—Preparation of Particles K—

Styrene/n-butyl methacrylate/acrylic acid copolymer (a hydrophilic monomer ratio of 8 mol %): 99.95 parts by weight BONTRON E-84 (a charge control agent, manufactured by Orient Chemical Industries, LTD.): 0.05 part by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier and classified.

Styrene/n-butyl methacrylate/acrylic acid copolymer (a hydrophilic monomer ratio of 8 mol %): 100 parts by weight The above-mentioned pulverized product: 120 parts by weight Polyvinyl alcohol: 1 part by weight The above-mentioned materials are mixed, stirred by a Henschel mixer and regarded as a kneading material. Subsequently, the kneading material is projected into an extruder and melt-kneaded. The obtained kneaded product is cooled and thereafter pulverized by using a jet mill. This is subjected to an air classifier to obtain particles having an average spherical equivalent diameter of 9 μm.

Subsequently, with 100 parts by weight of particles (host particles) obtained in this manner Calcium carbonate (externally added particles: NEO-LIGHT GP-20, manufactured by Takehara Chemical Industrial Co., Ltd., an average spherical equivalent diameter of 0.03 μm): 1 part by weight is mixed and stirred to prepare particles having an average spherical equivalent diameter of 9 μm, which are regarded as particles K.

—Preparation of Particles L—

Styrene/n-butyl methacrylate/acrylic acid copolymer (a hydrophilic monomer ratio of 80 mol %): 80 parts by weight BONTRON E-84 (a charge control agent, manufactured by Orient Chemical Industries, LTD.): 20 parts by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier and classified.

Styrene/n-butyl methacrylate/acrylic acid copolymer (a hydrophilic monomer ratio of 92 mol %): 100 parts by weight The above-mentioned pulverized product: 5 parts by weight Polyvinyl alcohol: 1 part by weight The above-mentioned materials are mixed, stirred by a Henschel mixer and regarded as a kneading material. Subsequently, the kneading material is projected into an extruder and melt-kneaded. The obtained kneaded product is cooled, thereafter coarsely pulverized by using a hammer mill and subsequently pulverized by using a jet mill. This is subjected to an air classifier to obtain particles (host particles) having an average spherical equivalent diameter of 9 μm.

Subsequently, with 100 parts by weight of particles (host particles) obtained in this manner Calcium carbonate (externally added particles: NEO-LIGHT GP-20, manufactured by Takehara Chemical Industrial Co., Ltd., an average spherical equivalent diameter of 0.03 μm): 1 part by weight is mixed and stirred to prepare particles having an average spherical equivalent diameter of 9 μm, which are regarded as particles L.

The characteristics of particles A to L prepared above are shown together in Table 3.

TABLE 3

| | Particle form of host particles | Hydrophobic polymer | | Hyrophilic polymer | Ratio between hydrophobic polymer and hydrophilic polymer (weight ratio) |
|---|---|---|---|---|---|
| | | Hydrophilic monomer ratio (mol %) | Charge control agent ratio (% by weight) | Hydrophilic monomer ratio (mol %) | |
| Particles A | Primary particles | 1 | — | 50 | 5:100 |
| Particles B | Primary particles | 5 | — | 45 | 15:100 |
| Particles C | Primary particles | 5 | — | 60 | 25:100 |
| | | 1.5 | | | |
| Particles D | Primary particles | 1 | 2 | 50 | 20:100 |
| Particles E | Primary particles | 0.75 | 6 | 75 | 80:100 |
| Particles F | Primary particles | 5 | 5 | 65 | 25:100 |
| Particles G | Primary particles | 2.5 | 1 | 70 | 40:100 |
| Particles H | Composite particles | 4.5 | 5 | 12.5 | 15:100 |
| Particles I | Composite particles | 1.8 | 0.6 | 17.5 | 5:100 |
| Particles J | Primary particles | 50 | 67 | 50 | 15:100 |
| Particles K | Primary particles | 8 | 0.05 | 8 | 120:100 |
| Particles L | Primary particles | 80 | 20 | 92 | 5:100 |

EXAMPLES II-1 to II-8 and COMPARATIVE EXAMPLES II-1 to II-3

Each of the above-mentioned particles is utilized as ink receptive particles to perform the following evaluations by using the following ink A. The results are shown in Table 4.

—Ink A—

The following ink components are mixed and stirred to thereafter prepare ink by filtering with the use of a membrane filter having a pore size of 5 μm.

—Ink Components—

Cyan pigment (C. I. Pig. Blue 15:3): 7.5 parts by weight

Styrene/acrylic acid (an acid value of 150 mg KOH/g): 2.5 parts by weight

Butyl carbitol: 2.5 parts by weight

Diethylene glycol: 10 parts by weight

Glycerol: 25 parts by weight

Nonionic surface active agent (acetylene glycol derivative): 1 part by weight pH adjustor and bactericide (PROXEL GXL(S), manufactured by Arch Chemicals Japan): a small amount Pure water: 60 parts by weight The obtained ink offers surface tension=33 mN/m, viscosity=7.2 mPa·s, pH=8.8 and volume-average particle diameter=92 nm.

—Image Disorder—

Image disorder is evaluated by forming an image in the following manner. The particles are sprayed on an intermediate medium by using a cake printer. At this time, the spray amount of the particles varies with kinds thereof and yet is in a range of 5 to 12 g/m². Ink of 2 pL is provided on this intermediate medium, on which the particles are sprayed, with an image area ratio of 1200×1200 dpi (dpi: the number of dots per inch) by using a piezo-type ink jet device to form a line image. OK Golden Cask (manufactured by Oji Paper Co., Ltd.) is welded with a pressure of $3 \times 10^5$ Pa to the image obtained in this manner to heat a recoding medium at a temperature of 90° C. for 1 minute. The image obtained in this manner is made into a magnified image by visual observation and using a microscope to determine image disorder.

The evaluation criterion is as follows.

A: no image disorder is caused in a magnified image

B: image disorder is caused in a magnified image and yet incapable of being distinguished by visual observation, which is in a permissible range B⁻: image disorder is caused in a magnified image and capable of being partially distinguished by visual observation, which is yet in a permissible range C: image disorder is capable of being entirely distinguished by visual observation, which is yet in a permissible range E: image disorder is capable of being distinguished by visual observation, which is out of a permissible range —Image After a Long-term Storage—

An image after a long-term storage is evaluated in the same manner as the evaluation method of image disorder by using ink receptive particles stored for 1 month under such an environment as a temperature of 28° C. and a humidity of 85 RH %.

The evaluation criterion is as follows.

A: no image disorder is caused in a magnified image

B: image disorder is caused in a magnified image and yet incapable of being distinguished by visual observation, which is in a permissible range B⁻: image disorder is caused in a magnified image and capable of being partially distinguished by visual observation, which is yet in a permissible range C: image disorder is capable of being entirely distinguished by visual observation, which is yet in a permissible range E: image disorder is capable of being distinguished by visual observation, which is out of a permissible range —Drying Time—

Drying time is evaluated by forming an image in the following manner. The particles are sprayed on an intermediate medium by using a cake printer. At this time, the spray amount of the particles varies with kinds thereof and yet is in a range of 5 to 12 g/m². Ink is provided with 4.5 g/m² on this intermediate medium, on which the particles are sprayed, by using a piezo-type ink jet device to form a solid image. A roller is pushed against the formed image portion with a load of $2 \times 10^4$ Pa to regard as drying time the time until the ink is not transferred to the side of the roller paper.

The evaluation criterion is as follows.

A: drying time of less than 0.3 second

B: drying time of 0.3 second or more and less than 0.5 second

B⁻: drying time of 0.5 second or more and less than 1 second

C: drying time of 1 second or more and less than 3 seconds

D: drying time of 3 seconds or more

TABLE 4

| | Ink receptive particle | Image disorder | Image after a long-term storage | Drying time |
|---|---|---|---|---|
| Example II-1 | Particles A | B | A | B |
| Example II-2 | Particles B | B | A | B |
| Example II-3 | Particles C | A | A | A |
| Example II-4 | Particles D | B | A | A |
| Example II-5 | Particles E | A | B | B |
| Example II-6 | Particles F | A | A | A |
| Example II-7 | Particles G | A | A | A |
| Example II-8 | Particles H | B | B | C |
| Example II-9 | Particles I | B | A | B |
| Comparative example II-1 | Particles J | C | D | A |
| Comparative example II-2 | Particles K | D | D | D |

As understood from Table 4, as compared with comparative examples, it is found in the examples that image disorder is restrained, an image after a long-term storage is favorable and drying time is excellent.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical application, thereby enabling others skilled in the art to understand the invention for various embodiments and with the various modifications as are suited to the particular use contemplated. It is intended that the scope of the invention be defined by the following claims and their equivalents.

What is claimed is:

1. An ink receptive particle for receiving ink, the ink receptive particle comprising:
    a particle P including a hydrophilic polymer particle, the hydrophilic polymer particle having a ratio of hydrophilic monomer(s) to the total monomer components thereof of from 30 mol % to 80 mol %; and
    a hydrophobic polymer particle attached to at least a part of a surface of the particle P and having an average spherical equivalent diameter from 0.015 μm to 0.2 μm, a ratio of hydrophilic monomer(s) to the total monomer components of the hydrophobic polymer particle being from 2 mol % to 5 mol % ;
    the hydrophilic monomer being a monomer comprising any one group selected from an ethylene oxide group, a carboxylic acid, a sulfonic acid, a substituted or unsubstituted amino group, a hydroxyl group and or thereof.

2. A material for recording, the material comprising:
    an ink; and
    the ink receptive particle of claim 1.

* * * * *